United States Patent
Westhues et al.

(10) Patent No.: US 9,377,646 B2
(45) Date of Patent: Jun. 28, 2016

(54) CAPACITIVE TOUCH SENSOR HAVING OBLIQUE ELECTRODE MATRIX

(71) Applicant: MICROSOFT TECHNOLOGY LICENSING, LLC, Redmond, WA (US)

(72) Inventors: Jonathan Westhues, Portland, OR (US); Sean M. Donnelly, Portland, OR (US); Jason D. Wilson, West Linn, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

(21) Appl. No.: 13/925,770

(22) Filed: Jun. 24, 2013

(65) Prior Publication Data

US 2014/0375902 A1 Dec. 25, 2014

(51) Int. Cl.
G06F 3/045 (2006.01)
G02F 1/1333 (2006.01)
G02F 1/1343 (2006.01)
G06F 3/044 (2006.01)

(52) U.S. Cl.
CPC ...... *G02F 1/13338* (2013.01); *G02F 1/134336* (2013.01); *G06F 3/044* (2013.01); *G06F 2203/04112* (2013.01)

(58) Field of Classification Search
CPC .................................................. G02F 1/13338
USPC ......................................................... 345/174
See application file for complete search history.

(56) References Cited

U.S. PATENT DOCUMENTS

| 7,009,663 | B2 | 3/2006 | Abileah et al. |
| 7,567,240 | B2 | 7/2009 | Peterson, Jr. et al. |
| 2002/0104691 | A1 | 8/2002 | Kent et al. |
| 2004/0239650 | A1 | 12/2004 | Mackey |
| 2008/0024461 | A1 | 1/2008 | Richter et al. |

(Continued)

FOREIGN PATENT DOCUMENTS

| JP | 2012053644 A | 3/2012 |
| JP | 2013120590 A | 6/2013 |
| WO | 2013039050 A1 | 3/2013 |

OTHER PUBLICATIONS

ISA European Patent Office, International Search Report & Written Opinion for PCT/US2014/043300, WIPO, Sep. 2, 2014, 11 Pages.

(Continued)

*Primary Examiner* — Jason Olson
(74) *Attorney, Agent, or Firm* — Brandon Roper; Judy Yee; Micky Minhas

(57) ABSTRACT

Electrode matrices for capacitive touch-sensing are provided. An electrode matrix may include a plurality of column conductors having a first end and a second end formed along a central longitudinal axis. The column conductor may further include a column zigzag structure extending between the first end and the second end. The electrode matrix may further include a plurality of row conductors having a first end and a second end formed along a lateral axis. The row conductor may further include a row zigzag structure extending between the first end and second end. The zigzag structure of each of the plurality of column conductors may cross the zigzag structure of each of the plurality of row conductors in respective crossing regions that are formed at an intersection of the longitudinal axis of each column conductor and lateral axis of each row conductor.

20 Claims, 11 Drawing Sheets

(56) References Cited

U.S. PATENT DOCUMENTS

| | | |
|---|---|---|
| 2009/0262092 A1 | 10/2009 | Halsey, IV et al. |
| 2010/0060602 A1 | 3/2010 | Agari et al. |
| 2010/0123670 A1 | 5/2010 | Philipp |
| 2010/0214247 A1 | 8/2010 | Tang et al. |
| 2010/0218100 A1 | 8/2010 | Simon et al. |
| 2010/0252335 A1 | 10/2010 | Orsley |
| 2011/0018841 A1 | 1/2011 | Hristov |
| 2011/0102361 A1 | 5/2011 | Philipp |
| 2011/0248953 A1 | 10/2011 | Lee et al. |
| 2011/0254790 A1 | 10/2011 | Suzuki et al. |
| 2011/0310037 A1 | 12/2011 | Moran et al. |
| 2012/0013546 A1 | 1/2012 | Westhues et al. |
| 2012/0062472 A1 | 3/2012 | Yilmaz |
| 2012/0062516 A1 | 3/2012 | Chen et al. |
| 2012/0086669 A1 | 4/2012 | Kim et al. |
| 2012/0092288 A1 | 4/2012 | Wadia |
| 2012/0162116 A1 | 6/2012 | Philipp |
| 2012/0242585 A1 | 9/2012 | Jones et al. |
| 2012/0261242 A1 | 10/2012 | Guard et al. |
| 2012/0327011 A1 | 12/2012 | Faubert et al. |
| 2013/0009905 A1 | 1/2013 | Castillo et al. |
| 2013/0032414 A1 | 2/2013 | Yilmaz et al. |
| 2013/0063371 A1* | 3/2013 | Lee et al. ............ 345/173 |
| 2013/0082964 A1 | 4/2013 | Agari et al. |
| 2013/0100054 A1 | 4/2013 | Philipp |
| 2013/0207911 A1 | 8/2013 | Barton et al. |
| 2013/0222328 A1 | 8/2013 | Cok et al. |
| 2014/0360856 A1* | 12/2014 | Mizumoto et al. ........ 200/600 |

OTHER PUBLICATIONS

ISA European Patent Office, International Search Report & Written Opinion for PCT/US2014/043301, WIPO, Sep. 1, 2014, 8 Pages.

Baharav, Zachi et al., "Capacitive Touch Sensing: Signal and Image Processing Algorithms", http://www3.ntu.edu.sg/home/ramakrishna/spie2011captouch.pdf, Proceedings of the SPIE Conference on Computational Imaging, Jan. 2011, 12 pages.

Keeping, Steven, "Improving Touch Screen Performance by Good Design", http://www.digikey.com/us/en/techzone/sensors/resources/articles/improving-touch-screen-performance.html, Sep. 16, 2011, 9 pages.

O'Connor, Todd, "mTouch™ Projected Capacitive Touch Screen Sensing Theory of Operation", http://ww1.microchip.com/downloads/en/DeviceDoc/93064A.pdf, Jan. 5, 2010, 16 pages.

ISA European Patent Office, International Search Report and Written Opinion for Patent Application No. PCT/US2014/010269, Feb. 25, 2014, 11 pages.

"3M Transparent Conductors Portfolio", Retrieved at http://sec002.whspn.net/Portals/displayweek/Files/1.1.pdf>>, Retrieved Date: Jan. 29, 2013, pp. 11.

Bittner, et al., "VersaPatch: A Low Cost 2.5D Capacitive Touch Sensor", Retrieved at <<http://research.microsoft.com/pubs/101230/versapatch%20a%20low%20cost%202.5d%20capacitive%20touch%20sensor_ray%20bittner_mike%20sinclair.pdf>>, In Proceedings of the 13th International Conference on Human-Computer Interaction. Part II: Novel Interaction Methods and Techniques, Aug. 2009, pp. 10.

IPEA European Patent Office, International Preliminary Report on Patentability Issued in Application No. PCT/US2014/043301, Sep. 2, 2015, WIPO, 7 pages.

IPEA European Patent Office, Second Written Opinion issued in Application No. PCT/US2014/043301, May 11, 2015, Germany, 6 pages.

\* cited by examiner

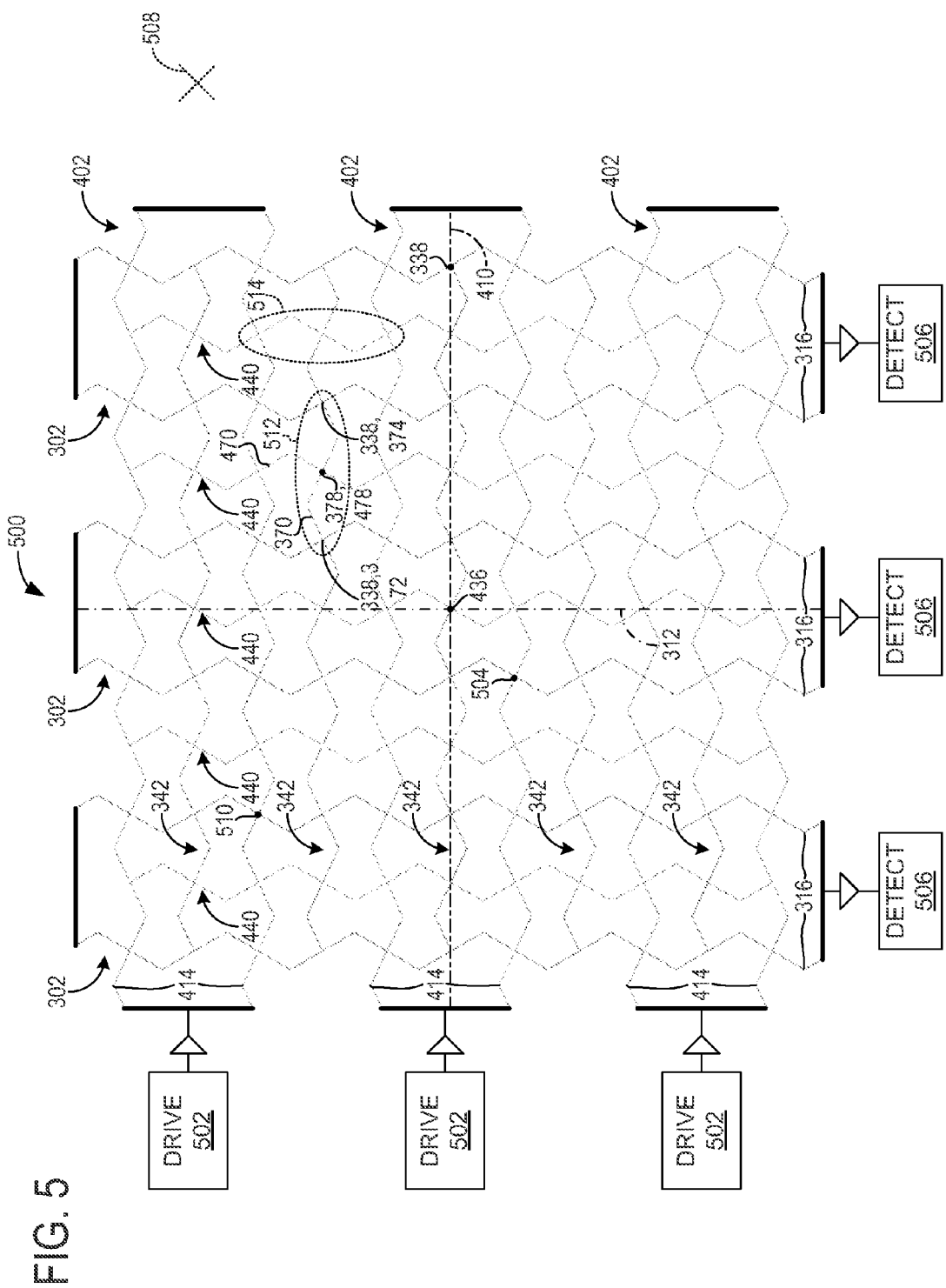

… (1) …

CAPACITIVE TOUCH SENSOR HAVING OBLIQUE ELECTRODE MATRIX

BACKGROUND

In a capacitive touch-sensitive display device, an image may be displayed while simultaneously detecting touch input from a user's digit or other input device. The capacitive touch-sensitive display device may include a touch surface, a display stack such as a liquid crystal display (LCD) stack, and a matrix of column and row electrodes positioned therebetween and configured to detect touch input based on changes in capacitance, for example the change in capacitance between columns and rows, or the change in capacitance between a row or column and ground. Such changes in capacitance may be used to determine a column-row pair closest to the touch input, and to determine the degree to which the touch input is off-center relative to the column-row pair. In this way, touch input may be detected and interpreted at high resolutions to control aspects of a computing device.

In one prior capacitive touch sensor design, an opaque metallic conductor is used for the capacitive touch sensor, and the column and row electrodes are oriented substantially vertically and horizontally relative to the LCD, between the display stack and adjacent the touch surface. However, with this design, the conductive elements visually occlude portions of the display stack, causing the user to perceive the presence of the touch sensor due to the formation of various artifacts created by the electrode-display occlusion. The perceptibility of these artifacts changes with the viewing angle of the viewer, but is particularly visible in such a design because the columns and rows are oriented vertically and horizontally, parallel to the underlying vertical columns and horizontal rows of the underlying pixels in the LCD.

In another prior capacitive touch sensor design, a capacitive touch sensor may be comprised of a transparent conductive oxide (TCO) such as indium tin oxide (ITO), to reduce visual perceptibility. When used in large format devices, however, TCO touch sensors have an electrical resistance that, in combination with the capacitances under test and certain other stray capacitances, may result in an RC time constant slow enough to limit the achievable excitation frequency of the touch sensor, and thus limit the achievable frame rate for a desired SNR. As a result, TCO is generally limited to application in displays with less than an approximately 30 inch diagonal dimension.

As discussed in more detail below, challenges exist for minimizing the visual perceptibility of capacitive touch sensors for large format capacitive touch-sensitive display devices. These challenges have generally slowed the development and adoption of such devices in the marketplace.

SUMMARY

To address these issues, an electrode matrix for a capacitive touch-sensing display device is provided. The electrode matrix may include a plurality of column conductors each having a first end and a second end formed along a central longitudinal axis of the column conductor. The column conductor may further include a column zigzag structure extending between the first end and the second end, and may oscillate back and forth across the longitudinal axis. The electrode matrix may further include a plurality of row conductors each having a first end and a second end formed along a horizontal axis of the row conductor. The row conductor may further include a row zigzag structure extending between the first end and second end, and may oscillate back and forth across the horizontal axis. The zigzag structure of each of the plurality of column conductors may cross the zigzag structure of each of the plurality of row conductors in respective crossing regions that are formed at an intersection of the longitudinal axis of each column conductor and horizontal axis of each row conductor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a schematic top view of a capacitive, touch-sensitive electrode matrix including the column electrode matrix of FIGS. 3A-F and the row electrode matrix of FIGS. 4A-B.

DETAILED DESCRIPTION

Figure 1:
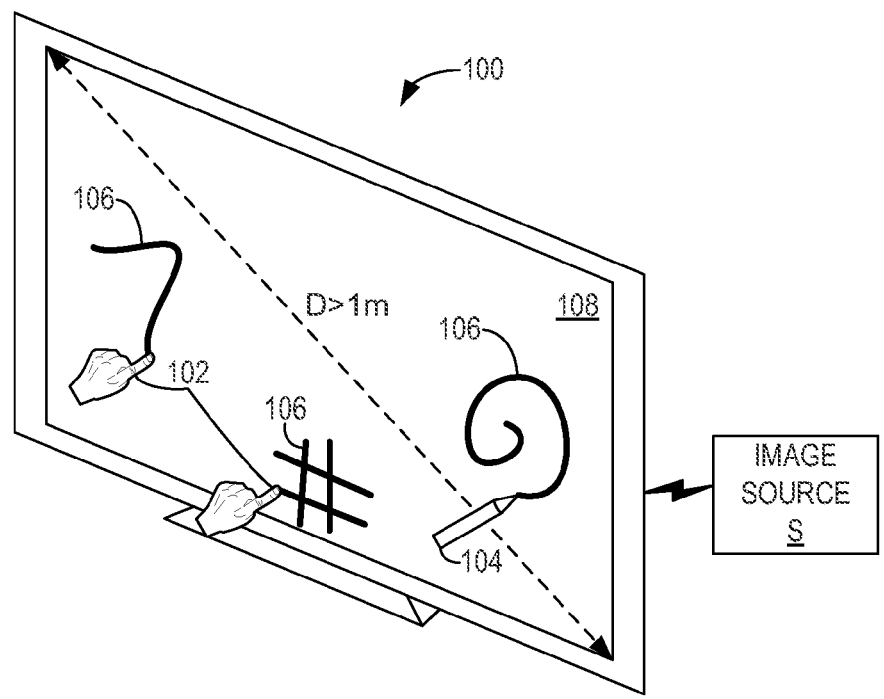
FIG. 1 is a perspective view of a large format multi-touch display device in accordance with one embodiment of the present disclosure.

A capacitive, touch-sensitive display device may include a touch surface, a display stack such as a liquid crystal display (LCD) stack, and a matrix of column and row electrodes forming a touch sensor positioned therebetween. Such a touch-sensitive display device may utilize the display stack to display an image viewable by a user while simultaneously using the electrode matrix to sense touch input (e.g., via a user digit or other input device such as a stylus). The touch input may comprise single touch inputs (e.g., via a single digit) or multi-modal touch input (e.g., concurrent input via two or more digits), and may be interpreted to control various aspects of a computing device to which the display device is coupled.

The column-row electrode matrix may be disposed on a side of the display device which faces a user—e.g., adjacent the touch surface. However, in this configuration the electrode matrix may occlude portions of the display stack, decreasing the quality of displayed images and allowing the user to perceive the electrode matrix. As such, the electrode matrix may be formed of a transparent conductive oxide (TCO) such as indium tin oxide (ITO). Capacitive touch sensors comprised of TCO, however, exhibit relatively low electrical conductivity, making their use prohibitive in large-format touch-sensitive display devices, such as those having diagonal dimensions exceeding 1 meter.

Alternatively, capacitive touch sensors may be comprised of non-transparent electrodes having low areal solidity. "Low areal solidity" as used herein refers to substantially opaque electrodes which occlude a relatively small percentage (e.g., 1-5%) of pixel in a display stack. A number of issues specific to such low areal solidity electrode matrices exist, however.

Although a low areal solidity electrode matrix may occlude a relatively small fraction of the display area, the occlusion may not be uniformly distributed across the display surface. This may cause the appearance of certain pixels or pixel regions to appear darker than surrounding pixel regions. A user may perceive the darker pixel regions and thus the presence of the electrode matrix even when individual conductors forming the matrix cannot be optically resolved.

Further, depending on the type of display stack and locations of occlusion, a variety of aliasing artifacts may appear from a user's perspective. For example, electrode conductors disposed at small angles relative to pixels horizontally and vertically aligned in a grid may create perceptible, multicolored or gray line segments, or other artifacts such as a moiré pattern. Such artifacts may be exacerbated by parallax variation created as a user's head moves relative to the display surface, as head motion may impart an apparent velocity to the artifacts, increasing their perceptibility.

Other problems arise with an electrode matrix comprising straight conductors formed as discrete wires attached to a substrate and skewed at oblique angles relative to a horizontally and vertically aligned pixel grid. For example, such a matrix may require a greater number of electrodes at the same electrode pitch to fill the same rectangular area, since that rectangle fills only a subset of the overall parallelogram matrix. The electrodes may additionally intersect the edges of the rectangular area at oblique angles, increasing the difficulty of terminating those electrodes. Accordingly, embodiments are directed to capacitive touch sensors having electrodes which exhibit increased uniformity and minimize the appearance of occlusion artifacts described above.

FIG. 1 shows a large format multi-touch display device 100 in accordance with an embodiment of the present disclosure. Display device 100 may have a diagonal dimension greater than 1 meter, for example. In other, particularly large-format embodiments, the diagonal dimension may be 55 inches or greater. Display device 100 may be configured to sense multiple sources of touch input, such as touch input applied by a digit 102 of a user or a stylus 104 manipulated by the user. Display device 100 may be connected to an image source S, such as an external computer or onboard processor. Image source S may receive multi-touch input from display device 100, process the multi-touch input, and produce appropriate graphical output 106 in response. Image source S is described in greater detail below with reference to FIG. 6.

Figure 2:
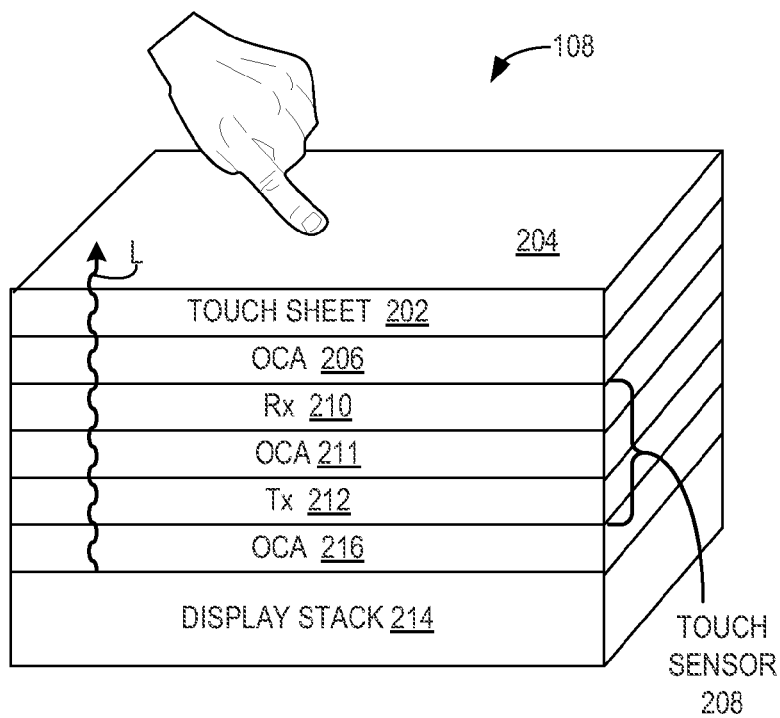
FIG. 2 is a cross-sectional view of an optical stack for a capacitive touch sensitive display of the large format multi-touch display device of FIG. 1.

Display device 100 may include a capacitive touch-sensitive display 108 to enable multi-touch sensing functionality. A schematic view of a partial cross section of an optical stack for capacitive touch-sensitive display 108 is shown in FIG. 2. In this embodiment, display 108 includes an optically clear touch sheet 202 having a top surface 204 for receiving touch input, and an optically clear adhesive layer 206 bonding a bottom surface of touch sheet 202 to a top surface of a touch sensor 208. Touch sheet 202 may be comprised of a suitable material, such as glass or plastic. Those of ordinary skill in the art will appreciate that optically clear adhesives refer to a class of adhesives that transmit substantially all (e.g., about 99%) of visible light that is incident upon them.

As discussed in further detail below with reference to FIGS. 3-5, touch sensor 208 is equipped with a matrix of electrodes comprising capacitive elements positioned a distance below touch sheet 202. As shown, the electrodes may be formed in two separate layers: a receive electrode layer 210 and a transmit electrode layer 212, which may each be formed on a respective dielectric substrate comprising materials including but not limited to glass, polyethylene terephthalate (PET), or cyclic olefin polymer (COP) film. Receive and transmit electrode layers 210 and 212 may be bonded together by a second optically clear adhesive layer 211. Adhesive layer 211 may be an acrylic pressure-sensitive adhesive film, for example. In other embodiments, however, layers 210, 211, and 212 may be integrally formed as a single layer with electrodes disposed on opposite surfaces of the integral layer.

Electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternative facing toward the user with a protective sheet (e.g., comprised of PET) between the user and metal. Although TCO is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold, etc.), metallic alloys, conductive allotropes of carbon (e.g., graphite, fullerenes, amorphous carbon, etc.), conductive polymers, and conductive inks (e.g., made conductive via the addition of metal or carbon particles).

Receive electrode layer 210 may be designated a column electrode layer in which electrodes are at least partially aligned to a longitudinal axis (illustrated as a vertical axis), while transmit electrode layer 212 may be designated a row electrode layer in which electrodes are at least partially aligned to a lateral axis (illustrated as a horizontal axis). Such designation, however, is arbitrary and may be reversed. It will be appreciated that the vertical and horizontal axes depicted herein and other vertical and horizontal orientations are relative, and need not be defined relative to a fixed reference point (e.g., a point on Earth). To detect touch input, row electrodes may be successively driven with a time-varying voltage, while the column electrodes are held at ground and the current flowing into each column electrode is measured. The electrodes are configured to exhibit a change in capacitance of at least one of the capacitors in the matrix in response to a touch input on top surface 204. Capacitors may be formed, for example, at each vertical intersection between a column electrode and a row electrode.

Changes in capacitance may be detected by a detection circuit as time-varying voltages are applied. Based on the time of detection and the degree of attenuation and/or phase shift in a measured current, the capacitance under test can be estimated and a row and column identified as corresponding to a touch input. The structure of the column and row electrodes is described in greater detail below with reference to FIGS. 3-5.

Various aspects of touch sensor 208 may be selected to maximize the SNR of capacitance measurements and thus increase the quality of touch sensing. In one approach, the distance between the receive electrodes and a light-emitting display stack 214 is increased. This may be accomplished by increasing the thickness of optically clear adhesive layer 211, for example, which may reduce the noise reaching the receive electrodes. As non-limiting examples, the thickness of adhesive layer 211 may be less than 1 mm and in some embodiments less than 0.2 mm. The noise reaching the receive electrodes may alternatively or additionally be decreased by increasing the thickness of optically clear adhesive layer 216. Moreover, the relative arrangement of column and row conductors maximizes the average distance between the column and row conductors in the plane of touch sensor 208—e.g., in a direction substantially perpendicular to a direction in which light L is emitted from a light-emitting display stack 214, as shown in FIGS. 3-5.

Continuing with FIG. 2, light-emitting display stack 214, which may be a liquid crystal display (LCD) stack, organic light-emitting diode (OLED) stack, plasma display panel (PDP), or other flat panel display stack is positioned below the electrode layers 210 and 212. An optically clear adhesive layer 216 joins a bottom surface of transmit electrode layer 212 to a top surface of display stack 214. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as a displayed image on top surface 204 of touch sheet 202.

Other embodiments are possible in which layer 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

Figure 3A:
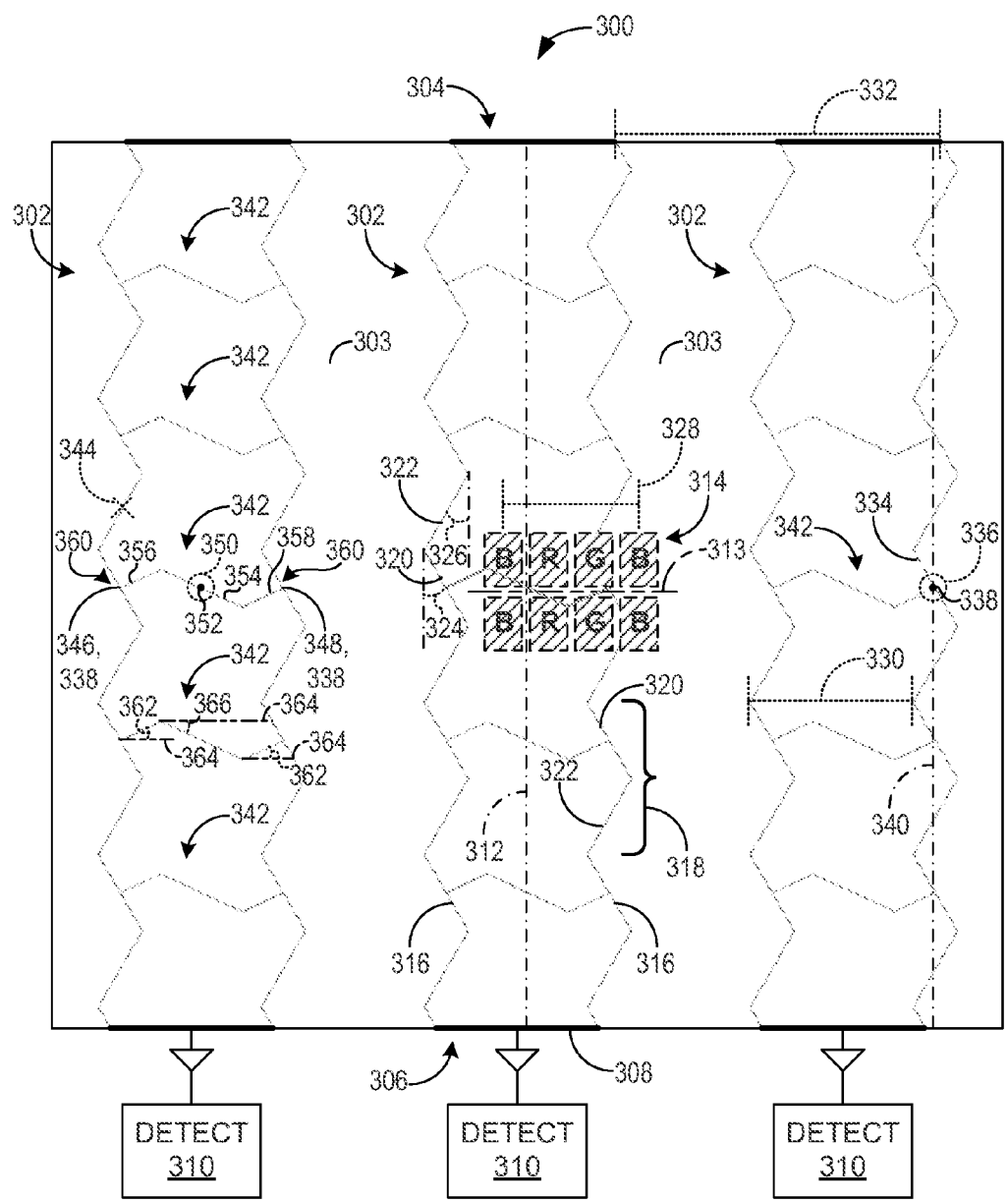
FIGS. 3A-F show schematic top views of a column electrode matrix in accordance with an embodiment of the present disclosure.

Turning now to FIG. 3A, an example embodiment of a column electrode matrix 300 is shown. As described above, matrix 300 may be formed in electrode layers 210 or 212 via a variety of suitable processes, including deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing.

In this example, three column electrodes 302 are shown which, along with a plurality of additional column electrodes, may form column electrode matrix 300. A column electrode 302 positioned at the center of column electrode matrix 300, for example, includes a first end 304 and a second end 306 between which the structure of the electrode extends. First and second ends 304 and 306 may each correspond to a terminal pad (e.g., terminal pad 308) electrically joining conductive segments forming column electrode 302, thereby creating a contiguous, conductive column electrode configured to sense touch input in cooperation with a corresponding row electrode, described in further detail below with reference to FIGS. 4 and 5. Bottom terminal pads of each column electrode 302 (e.g., terminal pad 308) may be electrically coupled to respective detection circuits 310 configured to sense changes in capacitance between column and row electrodes, as described in further detail below with reference to FIG. 5. Alternatively, the bottom terminal pads may be connected to a drive circuit also described in further detail below.

First and second ends 304 and 306 of column electrode 302 in this example are formed along a central vertical axis 312 extending from first end 304 to second end 306. Central vertical axis 312 may correspond to a vertical axis of a plurality of pixels positioned below column electrode matrix 300 and its corresponding layer in a display stack, though it will be appreciated that the central vertical axis may facilitate relative positioning and may not be defined relative to a fixed reference point (e.g., a point on Earth). For example, a plurality of pixels disposed in display stack 214 may be substantially aligned (e.g., within 5°) to vertical axis 312 of column electrodes 302 positioned in transmit electrode layer 212, the transmit electrode layer positioned vertically above display stack 214. Eight pixels 314 are shown as a non-limiting example, aligned to vertical axis 312 along their vertical dimensions (e.g., lengths). Pixels 314 are further aligned to a horizontal axis 313 such that the pixels form a horizontally and vertically aligned grid, and, along with a plurality of additional pixels, form an underlying display as viewed in a direction substantially perpendicular to a plane of the display (e.g., along a direction extending into the page of FIG. 3A). Horizontal axis 313, like central vertical axis 312, may facilitate relative positioning and may not be defined relative to a fixed reference point (e.g., a point on Earth). It will be appreciated that "pixel" as used herein with reference to the illustrated embodiments may refer to one of several subpixels which may collectively form an overall pixel. In some embodiments, three subpixels of alternating color (e.g., blue, red, green) each having an aspect ratio of approximately 1:3 (e.g., width:height) may form an overall pixel that is substantially square.

Each column electrode 302 comprises a pair of spaced apart column conductors 316 which form the vertical lengths of each column electrode and are joined by top and bottom tie structures such as terminal pads (e.g., terminal pad 308) and other conductive electrode structures to form contiguous, conductive column electrodes. Column conductors 316 each include a column zigzag structure extending from first end 304 to second end 306, represented in part by a column zigzag structure portion 318. In this example, each column conductor includes the same zigzag structure, though alternative embodiments are possible in which more than one zigzag structure is used in a column electrode or column electrode matrix, including asymmetric arrangements. The overall column zigzag structure extends along vertical axis 312 and oscillates back and forth across the vertical axis, alternately comprising positively and negatively angled linear conductor segments. For reference, in the column conductors 316 the zigzag structures, as traversed from the top of the page to the bottom, turn positive as they angle toward the right of the page, and negative as they return to the left, whereas for row conductors described below, the zigzag structures turn positive as they angle upwards toward a top of the page, and negative as they angle downward toward a bottom of the page. For example, column zigzag structure portion 318 alternately includes a positively angled column segment 320 positioned vertically above and adjoined at a bottom endpoint to a top endpoint of a negatively angled column segment 322. The overall column zigzag structure thus alternately includes negatively angled, linear column segments adjoined to positively angled, linear column segments at respective bottom and top endpoints.

Positively angled column segment 320 and negatively angled column segment 322 may be positioned at oblique angles relative to a vertical axis such as vertical axis 312. An example of such oblique angles is represented by a positive column angle 324 and a negative column angle 326, formed relative to a vertical axis such as vertical axis 312. Positively angled column segments (e.g., segment 320) may be positioned at positive column angle 324 relative to vertical axis 312, while negatively angled column segments (e.g., segment 322) may be positioned at negative column angle 326 relative to vertical axis 312. As non-limiting examples, angles 324 and 326 may be between 0° and +/−45°, and in particular between +/−15° and +/−35° for embodiments in which column electrodes are disposed vertically above an LCD display stack. Positive and negative column angles 324 and 326 in some embodiments may be equal and additive inverses of each other—for example, an angle θ of negative column angle 326 may be equal to an angle −θ of positive column angle 324 such that negatively angled column segments (e.g., segment 322) in column electrode 302 are a reflection about a vertical axis (e.g., vertical axis 312) of positively angled column segments (e.g., segment 320) in the column electrode.

As the negatively and positively angled column segments may be positioned at oblique angles relative to vertical axis 312, the column segments may be positioned obliquely relative to pixels in display stack 214 and the directions along which their vertical dimensions extend (e.g., along vertical axis 312) as seen from a viewing direction substantially perpendicular to a plane (e.g., surface) of the display stack. As such, placement of column segments at oblique angles relative to vertical axis 312 may reduce pixel occlusion and minimize the presence and visibility of the artifacts described above (e.g., variously colored line segments, moiré patterns, etc.).

Each column conductor 316 in column electrodes 302 may have a width (e.g., measured along a direction substantially perpendicular to a column electrode segment) that is small relative to a display pixel pitch. "Display pixel pitch" as used herein refers to the horizontal distance (e.g., as measured along horizontal axis 313) between corresponding points of adjacent pixels of the same color. For example, a pixel pitch 328 is shown, extending from midpoints of adjacent blue pixels, separated by a red pixel and a green pixel. As non-limiting examples, the width of column conductors 316 may be less than 3%, 2%, or 1.5% of pixel pitch 328 in respective embodiments. Further, column conductors 316 may have a thickness, as measured in a direction perpendicular to the layer in which they are disposed (e.g., perpendicularly from the surface of transmit electrode layer 212), equal or less than the width of the column conductors. For example, this thickness may be 40% or 20% of the column conductor width in respective embodiments.

The lengths of each column segment (e.g., segments 320 and 322) may be equal, and as a non-limiting example may be 1.5 mm as measured along vertical axis 312. Further, conductors 316 in each electrode 302 may be separated by a common column conductor pitch 330, which may be, for example, 3.2 mm. Similar to pixel pitch 328, column conductor pitch 330 may be the horizontal distance along horizontal axis 313 between corresponding points on adjacent conductors 316. Each column electrode 302 may in turn be separated by a common column electrode pitch 332 which may be as a non-limiting example 6.4 mm. Column electrode pitch may be the horizontal distance along horizontal axis 313 between corresponding points on adjacent electrodes 302.

It will be appreciated that the dimensions described above, including column segment angles, column segment lengths, and conductor widths and thicknesses are provided as non-limiting examples and are selected based on a desired column electrode density and suited to characteristics (e.g., resolution) of a display stack above which the column electrode matrix is to be positioned. Such parameters may be varied without departing from the scope of this disclosure. For example, the number of column electrodes and column segments in each column conductor may vary depending on the resolution and size of the associated display stack. Moreover, although column electrodes 302 are shown having a partially rectangular shape augmented by oscillating zigzag structures, such rectangular profile may be varied without departing from the scope of this disclosure. Although column electrodes 302 are shown comprising pairs of column conductors 316, it will be understood that column electrodes may comprise three or more column conductors, and in some embodiments more than one column electrode may occupy a given vertical region (e.g., column).

In the example shown in FIG. 3A, truncated, positively angled column segments 320 adjoin first and second ends 304 and 306 of each conductor 316. It will be noted that such the degree of such truncation may vary depending on various characteristics of the display device in which column electrode matrix 300 is to be disposed, for example the size and/or resolution of the display stack. In some embodiments, conductors 316 may adjoin first and second ends 304 and 306 at endpoints of negatively and/or positively angled column segments or anywhere therebetween.

Continuing with FIG. 3A, column electrodes 302 and column conductors 316 may be vertically aligned to vertical axis 312 as a result of vertical alignment of column segment midpoints. In particular, each column segment in each column electrode 302 may include a central region which may be aligned to a vertical axis such as vertical axis 312. The central region may substantially correspond (e.g., arranged concentrically) to a midpoint of a column segment. In some embodiments, the midpoints of each column segment in column electrodes 302 may be aligned to vertical axis 312. FIG. 3A shows an exemplary column segment 334 including a central region 336 having a substantially circular shape. In this example, central region 336 corresponds to and is centered about a first midpoint 338 which characterizes the middle point of column segment 334. A midpoint vertical axis 340 illustrates the vertical alignment of the central regions and midpoints of each column segment in this particular column electrode 302. It will be appreciated that midpoint vertical axis 340 may be a transposed instance of vertical axis 312, and that column segments for a given column conductor and column electrode may be aligned about other points within central region 336 including those other than first midpoint 338. Alternatively, points along column segments outside of central region 336 may be aligned to midpoint vertical axis 340.

Each column electrode 302 further includes a plurality of column tie-structures or jumpers 342. Column jumpers 342 are electrically conductive structures configured to electrically bridge adjacent column conductors 316 in a given column electrode 302 (e.g., adjacent pairs of column conductors) and facilitate touch sensing at a sufficient accuracy and speed even in the presence of defects in the structure of the column conductors.

During manufacture of column electrode matrix 300, and particularly in processes in which a thin layer of metal is patterned in a material deposition or removal process, a plurality of discontinuity defects may appear in the structure of the electrodes and their constituent conductors. In a photo-etching process, for example, pinhole defects may result from particulate shadowing of photoresist during exposure. A pinhole defect is gap creating a discontinuous break in the structure of a conductor such that there is no longer a contiguous pathway through which electrical current may travel. FIG. 3A shows an example of a pinhole defect 344 which has appeared in a central region of a negatively angled column segment 322 of a column conductor 316 at a left side of a column electrode 302 at a left side of column electrode matrix 300. Although current is unable to traverse defect 344 and travel through its corresponding column conductor portion, current may shunt around and bypass the defect by routing through adjacent column jumpers 342 above and below. In this way, spatially sufficient touch sensing may be provided by an electrode matrix having a plurality of defects.

Similar to column conductors 316, column jumpers 342 include a column jumper zigzag structure extending between a first column jumper endpoint 346 and a second column jumper endpoint 348. First column jumper endpoint 346 is electrically adjoined to a respective first midpoint 338 of an adjacent positively angled column segment 320 (e.g., in a left column conductor 316), and second column jumper endpoint 348 is likewise electrically adjoined to a respective first midpoint 338 of an adjacent positively angled column segment 320 (e.g., in a right column conductor 316). First and second column jumper endpoints 346 and 348 may be horizontally aligned along horizontal axis 313, for example. Other configurations are possible, however, such as those in which column jumpers electrically bridge negatively angled column segments, negatively angled and positively angled column segment pairs, and those in which the first and second column jumper endpoints are not aligned along a horizontal axis. Further, in some embodiments, column jumpers 342 may adjoin regions of column segments other than first midpoint 338—e.g., within central region 336 but away from the first midpoint.

Column jumpers 342 further include a column jumper central region 350 which includes a column jumper midpoint 352. Column jumper central region 350 may substantially correspond (e.g., arranged concentrically) to column jumper midpoint 352, which may be horizontally aligned with first and second column jumper endpoints 346 and 348. Endpoints 346 and 348, and midpoint 352, may be collectively aligned along horizontal axis 313.

In this embodiment, the column jumper zigzag structure extending between first and second column jumper endpoints 346 and 348 includes three column jumper segments alternately angled at positive and negative angles about a horizontal axis (e.g., horizontal axis 313), similar to the column conductor zigzag structure described above. In particular, each column jumper 342 includes a column jumper middle segment 354, to which column jumper central region 350 and column jumper midpoint 352 correspond. Middle segment 354 is surrounded by and adjoined to on a left side a first column jumper end segment 356, and on a right side a second column jumper end segment 358. End segments 356 and 358 each include a column jumper distal end 360, each of which respectively include first and second column jumper endpoints 346 and 348, at which the column jumpers 342 are connected to adjacent portions of column conductors 316.

Although the inclusion of column jumpers 342 may facilitate sufficient touch sensing in the presence of discontinuity defects, their presence may occlude horizontally aligned pixels in a display stack disposed below column electrode matrix 300, creating artifacts as described above. Put another way, the inclusion of column jumpers 342 increases the areal solidity of column electrode matrix 300. To reduce pixel occlusion and minimize the perceptibility of occlusion artifacts, the column jumper zigzag structure may be disposed obliquely relative to pixels therebelow. In the embodiment shown in FIG. 3A, first column jumper end segment 356, column jumper middle segment 354, and second column jumper end segment 358 are alternately arranged at positive and negative oblique angles relative to horizontal. Such angles are shown for a particular column jumper 342 in a leftmost column electrode 302; first column jumper end segment 356 forms a positive row angle 362 with a horizontal axis 364, column jumper middle segment 354 forms a negative row angle 366 with horizontal axis 364, and second column jumper end segment 358 forms positive row angle 362 with horizontal axis 364. Horizontal axis 364 may be a transposition of horizontal axis 313, for example. It will be appreciated that other embodiments are possible in which first and second column jumper end segments 356 and 358 form different angles with horizontal axis 364.

As non-limiting examples, positive row angle 362 may be 25°, and negative row angle 366 may be −25° (335°, alternatively), while the pitch of first column jumper end segment 356, column jumper middle segment 354, and second column jumper end segment 358, as measured along horizontal axis 365, may be 0.8 mm, 1.6 mm, and 0.8 mm, respectively. Such angles and pitches may be adjusted without departing from the scope of this disclosure, however, and may be selected based on various characteristics desired of the touch-sensitive display device in which the column electrodes are to be positioned, including but not limited to display and touch-sensing resolution. As each segment of column jumpers 342 may be positioned obliquely relative to horizontal axis 313 and to pixels in a display stack as viewed in a direction substantially perpendicular to the surface of column electrode matrix 300 and the display stack, the perceptibility of artifacts resulting from pixel occlusion by the column jumpers may be reduced. In this way, touch sensing may be sufficiently performed in the presence of electrical discontinuity defects in an electrode matrix without significantly reducing the quality of images displayed by a display stack positioned below the electrode matrix and reducing the quality of user experience.

Figure 3B:
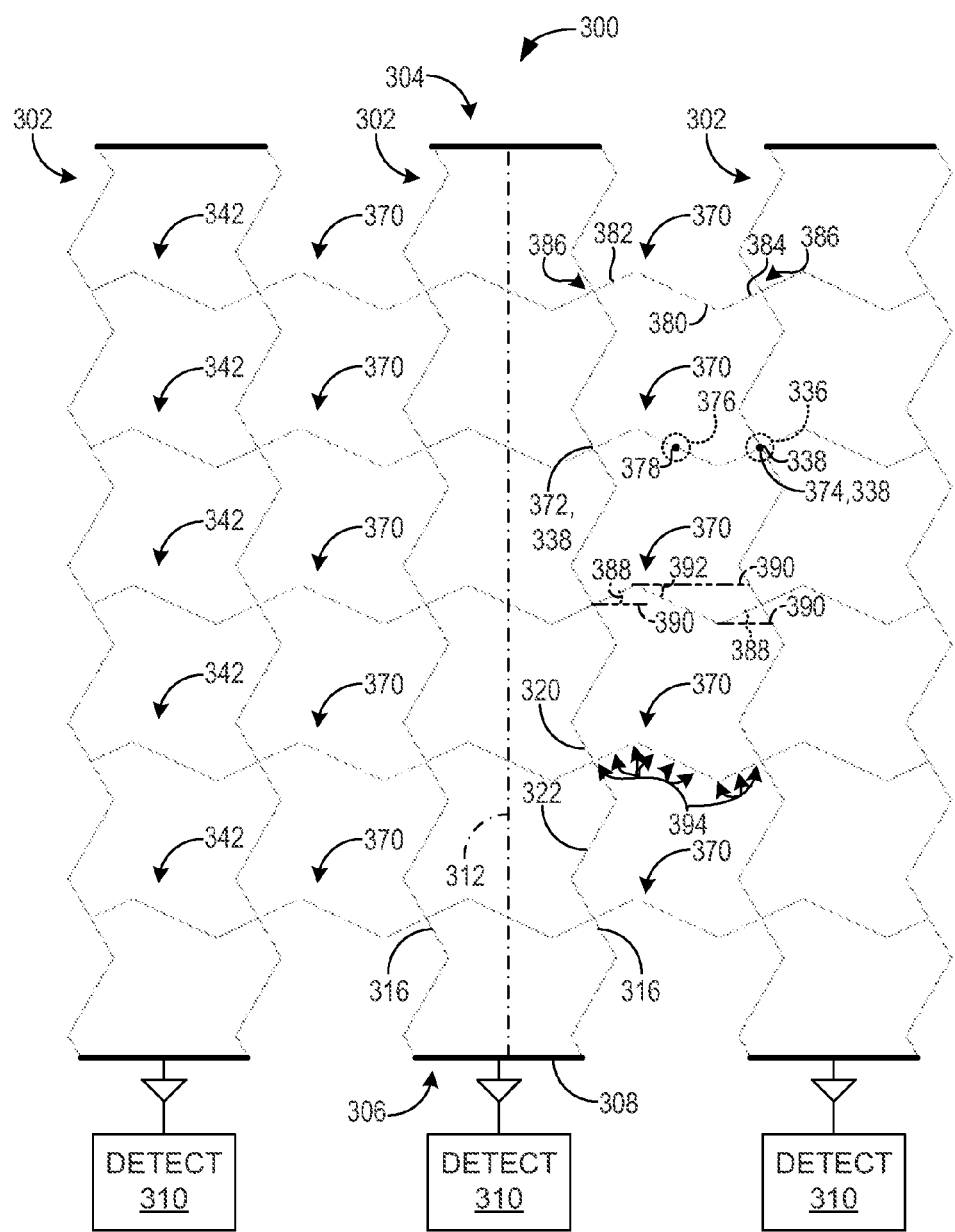

Although positioning column jumper segments at oblique angles relative to underlying pixels and their horizontal and vertical axes may reduce the perceptibility of artifacts resulting from occlusion of the pixels by the jumper segments, some artifacts may remain perceptible to a degree by some users in certain scenarios. For example, while obliquely positioned column jumpers may render the appearance of variously colored lines and moiré patterns proximate the column jumpers substantially imperceptible, the underlying pixels which are vertically occluded by the column jumpers may appear darker than surrounding unoccluded pixels as the amount of light transmitted from the occluded pixels to a user is reduced. A user may become aware of the presence of an electrode matrix due to a perceptible difference in brightness between the occluded pixels and the surrounding unoccluded pixels. FIG. 3B shows an embodiment of column electrode matrix 300 including a plurality of electrically isolated inter-column pseudo jumper 370, which may be used to reduce the difference in light output between occluded and unoccluded pixels, in turn reducing the perceptibility of an electrode matrix and its constituent structures.

In the depicted embodiment, inter-column pseudo jumper 370 have a structure substantially similar to that of column jumpers 342, though it will be appreciated that their structures may be varied in an asymmetric manner. In particular, inter-column pseudo jumper 370 include an inter-column zigzag structure extending between a first inter-column jumper endpoint 372 and a second inter-column jumper endpoint 374. The pseudo jumpers are configured to be non-conductive across their entire lengths—e.g., the pseudo jumpers may be comprised of one or more conductive materials but may nevertheless be non-conductive from end to end due to their structures as described in further detail below. The pseudo jumpers are further configured to reduce the perceptibility of jumpers 342 and artifacts without affecting the touch sensing functionality of column electrode matrix 300.

First inter-column jumper endpoint 372 is adjoined to a respective first midpoint 338 of an adjacent positively angled column segment 320 (e.g., in a left column conductor 316), and second inter-column jumper endpoint 374 is likewise adjoined to a respective first midpoint 338 of an adjacent positively angled column segment 320 (e.g., in a right column conductor 316). First and second inter-column jumper endpoints 372 and 374 may be horizontally aligned along horizontal axis 313, for example, and may also be horizontally aligned with first and second column jumper endpoints 346 and 348 of corresponding column jumpers 342 substantially occupying the same horizontal region (e.g., row) in which the inter-column pseudo jumper 370 are positioned. In such a case, column jumpers 342 and inter-column pseudo jumper 370 may be substantially aligned along a horizontal axis to reduce the difference in brightness between occluded and unoccluded pixels and thus reduce the perceptibility of such difference. Other configurations are possible, however, such as those in which first and second inter-column jumper endpoints 372 and 374 are adjoined to other points along positively angled column segments 320 or are adjoined to points (e.g., midpoints) along negatively angled column segments 322, particularly in embodiments in which column jumpers 342 also adjoin to negatively angled column segments at their endpoints.

Inter-column pseudo jumper 370 further include an inter-column jumper central region 376 which includes an inter-column jumper midpoint 378. Inter-column jumper central region 376 may substantially correspond (e.g., arranged concentrically) to inter-column jumper midpoint 378, which may be horizontally aligned with first and second inter-column jumper endpoints 372 and 374, and also with corresponding column jumper midpoints 352. Endpoints 372 and 374, and midpoint 378, may be collectively aligned along horizontal axis 313, for example.

In this embodiment, the inter-column jumper zigzag structure extending between first and second inter-column jumper endpoints 372 and 374 includes three inter-column jumper segments alternately angled at positive and negative angles about a horizontal axis (e.g., horizontal axis 313), similar to the column jumper zigzag structure described above. In particular, each inter-column pseudo jumper 370 includes an inter-column jumper middle segment 380, to which inter-column jumper central region 376 and inter-column jumper midpoint 378 correspond. Middle segment 380 is surrounded by and adjoined to on a left side a first inter-column jumper end segment 382, and on a right side a second inter-column jumper end segment 384. End segments 382 and 384 each include a column jumper distal end 386, each of which respectively include first and second inter-column jumper endpoints 372 and 374, at which the inter-column pseudo jumper 370 are connected to adjacent portions of column conductors 316.

Like column jumpers 342, first inter-column end segment 382, inter-column jumper middle segment 380, and second inter-column end segment 384 are alternately arranged at positive and negative oblique angles relative to horizontal. Such angles are shown for a particular inter-column pseudo jumper 370 in an inter-column region interposed between a central column electrode 302 and a rightmost column electrode 302; first inter-column jumper end segment 382 forms a positive row angle 388 with a horizontal axis 390, inter-column jumper middle segment 380 forms a negative row angle 392 with horizontal axis 390, and second inter-column end segment 384 forms positive row angle 388 with horizontal axis 390. Horizontal axis 390 may be a transposition of horizontal axis 313, for example. It will be appreciated that other embodiments are possible in which first and second column jumper end segments 382 and 384 form different angles with horizontal axis 390.

As non-limiting examples, positive row angle 388 may be 25°, and negative row angle 392 may be −25° (335°, alternatively), while the pitch of first inter-column jumper end segment 382, inter-column jumper middle segment 380, and second inter-column jumper end segment 384, as measured along horizontal axis 390, may be 0.8 mm, 1.6 mm, and 0.8 mm, respectively, corresponding to the respective angles and pitches of column jumpers 342. Such angles and pitches may be adjusted without departing from the scope of this disclosure, however, and may be selected based on various characteristics desired of the touch-sensitive display device in which the column electrodes are to be positioned, including but not limited to display and touch-sensing resolution. Further, the angles and/or pitches of inter-column pseudo jumper 370 may vary compared to those of column jumpers 342 in some embodiments.

FIG. 3B also shows how inter-column pseudo jumper 370 are electrically isolated from adjacent conductive structures (e.g., column jumpers 342, conductors 316) and configured to not route or otherwise transmit electrical current throughout their structures (e.g., end to end) or to the structures to which they are adjoined. In particular, one or more discontinuities 394 (shown for a particular inter-column pseudo jumper 370) may be applied during a manufacturing process which electrically isolate inter-column pseudo jumper 370 from one or both of adjacent conductors 316 and interrupt an otherwise contiguous pathway through which current may flow, and further render the pseudo jumpers electrically non-conductive. Thus, although in some embodiments comprised of one or more electrically conductive materials, inter-column pseudo jumper 370 are unable to transmit current from one conductor 316 to another, maintaining the structure of column electrode matrix 300 and its touch-sensing functionality. However, as the inter-column pseudo jumper 370 are positioned in regions between adjacent column electrodes 302, and in the depicted embodiment horizontally aligned with column jumpers occupying the same horizontal region (e.g., row), rows of column jumpers and inter-column jumpers may appear substantially contiguous. Although the jumpers may not be optically resolvable, their perceptibility may be reduced as the difference in light output between occluded and unoccluded pixels is made less apparent.

Figure 3C:
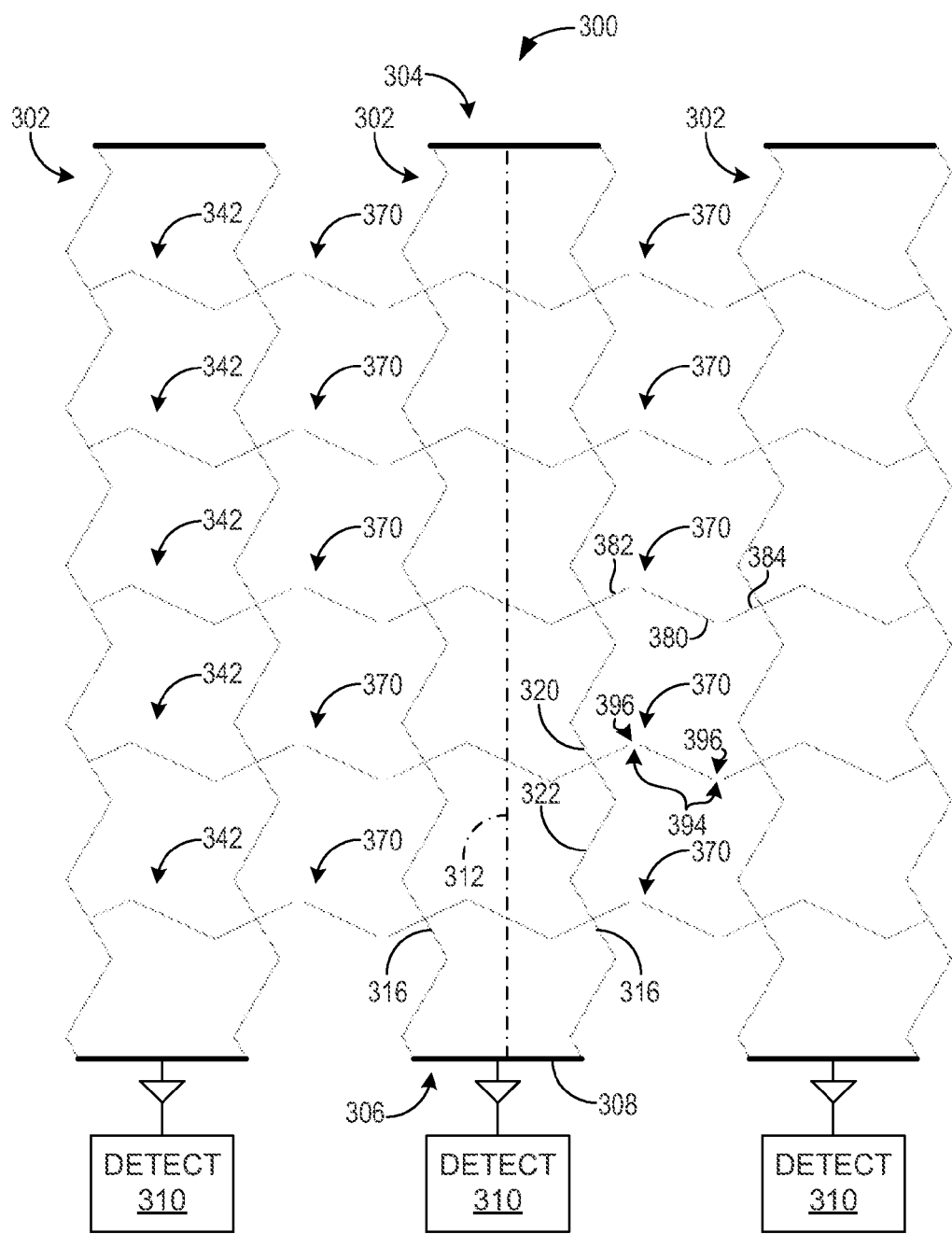
Figure 3D:
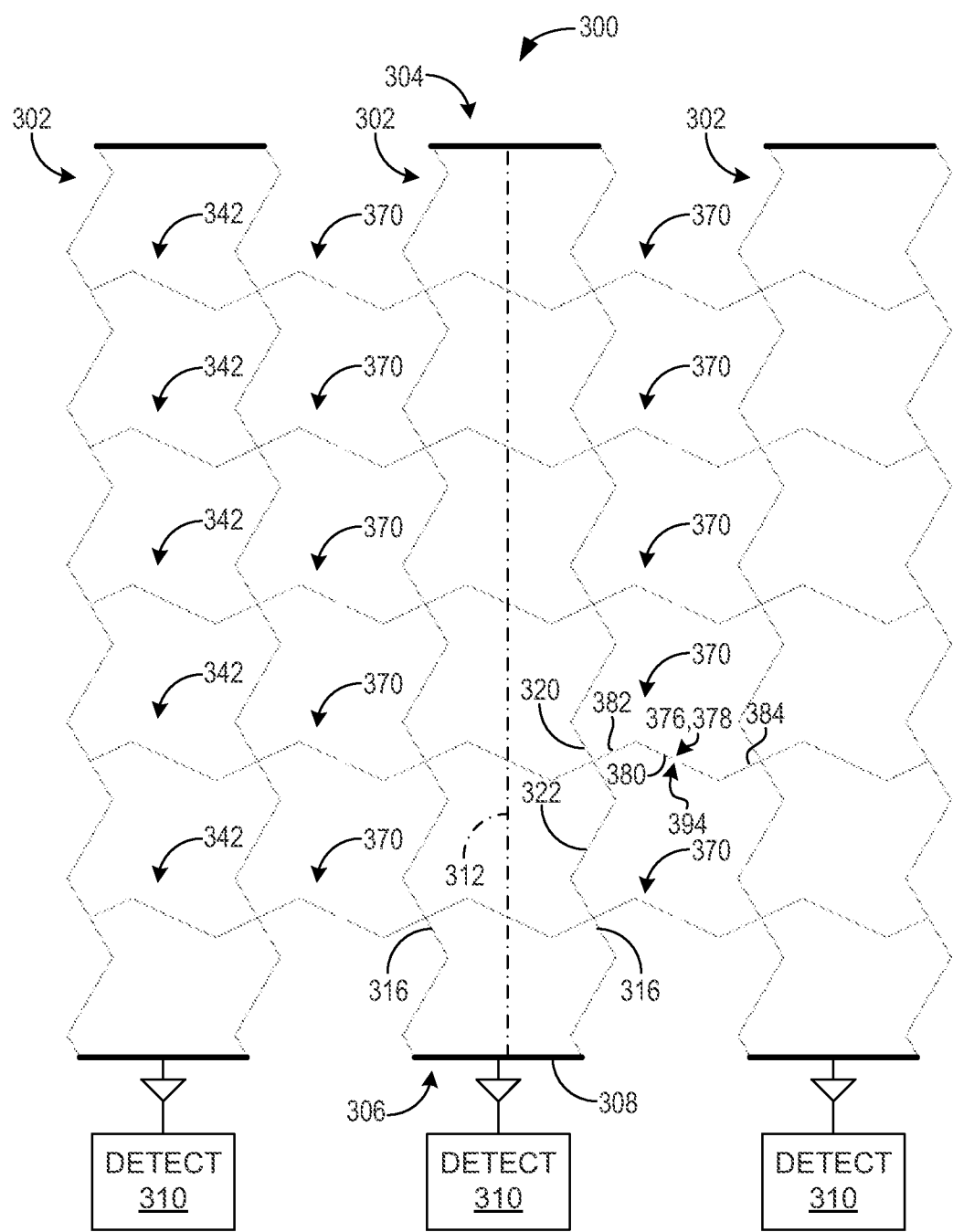
Figure 3E:
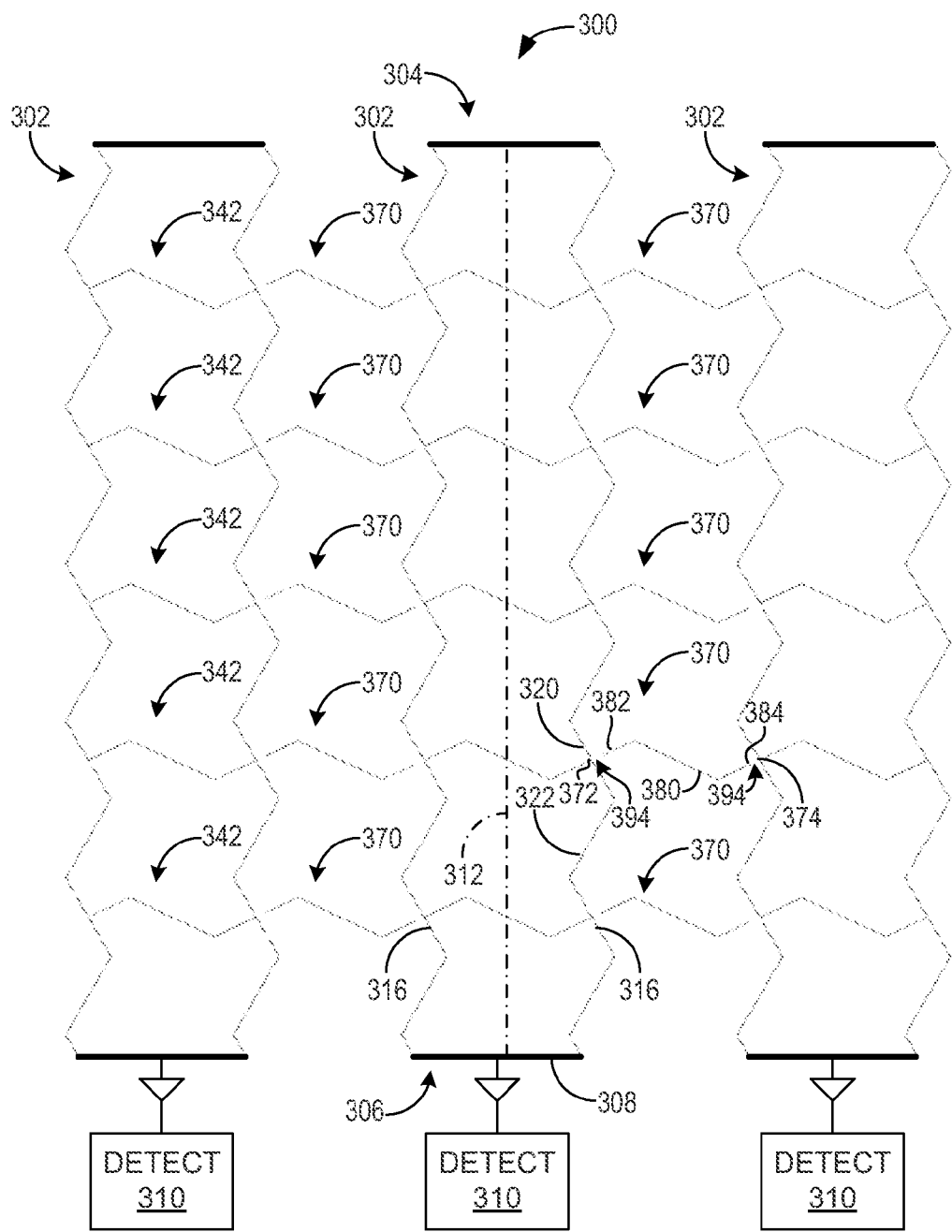
Figure 3F:
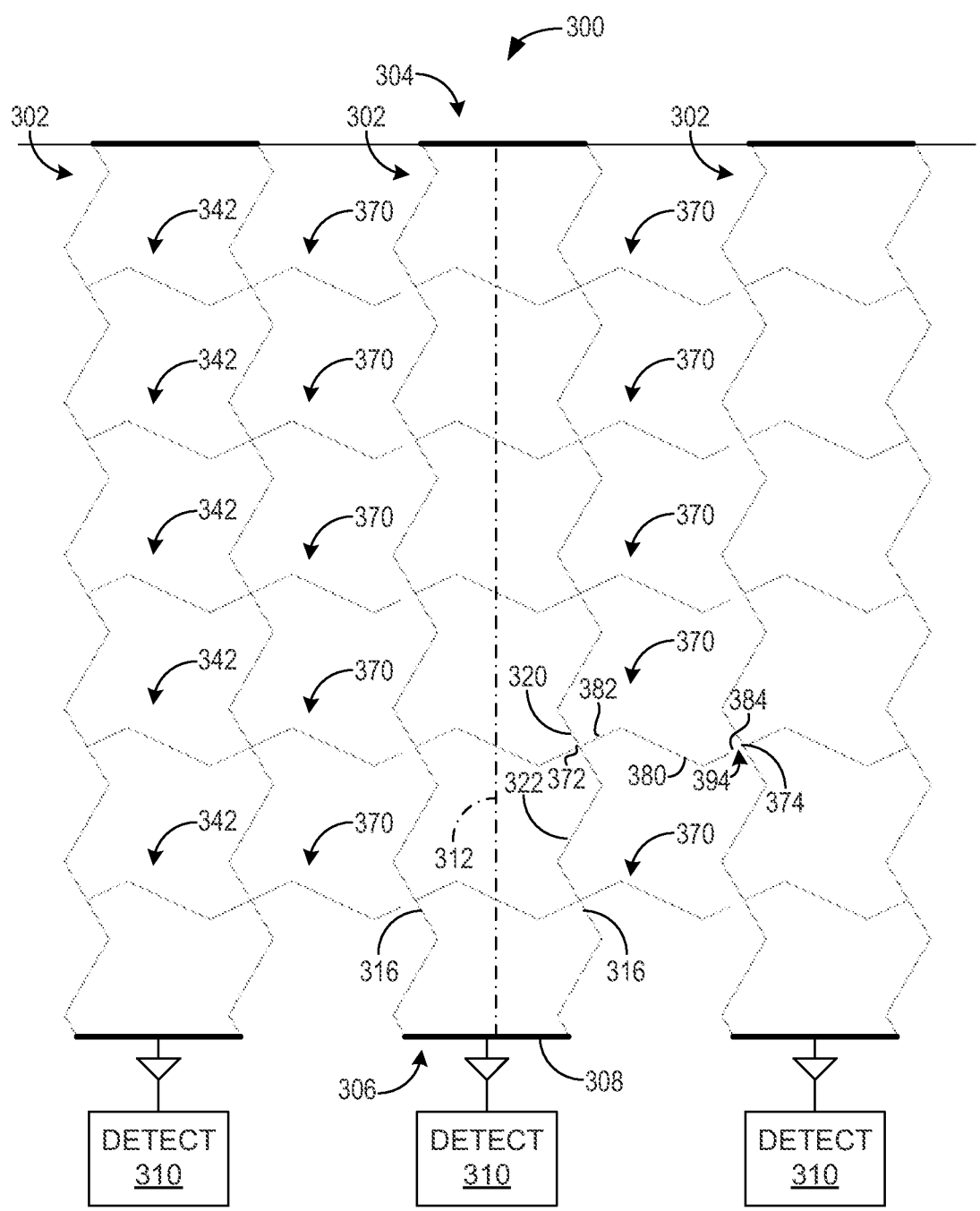

FIG. 3B further shows one embodiment of an application of discontinuities 394 to inter-column pseudo jumper 370. In this illustrated approach, a plurality (e.g., nine) of discontinuities 394 are approximately evenly spaced throughout the structure of inter-column pseudo jumper 370 and their constituent end and middle segments, breaking the inter-column jumpers into eight segments of approximately equal length and perforating the pseudo jumpers along their entire lengths (e.g., the sum of the lengths of the end and middle segments). Other approaches are possible, however. Typically, the inter-column pseudo jumper 370 are made of electrically conductive material, and the discontinuities are gaps in the electrically conductive material that prevent current from conducting across the entire column-to-column length of the inter-column jumper. FIG. 3C shows an embodiment of column electrode matrix 300 including a plurality of inter-column pseudo jumper 370 having two discontinuities 394 applied to their structures. In particular, discontinuities 394 are disposed at inflection points 396 at which inter-column jumper middle segment 380 adjoins first and second inter-column end segments 382 and 384, separating the middle segment from the surrounding end segments. FIG. 3D shows yet another embodiment of column electrode matrix 300 including a plurality of inter-column pseudo jumper 370 having a single discontinuity 394 applied to their structures. Particularly, discontinuity 394 is disposed at a region substantially corresponding to inter-column jumper central region 376 and inter-column jumper midpoint 378. In this embodiment, each inter-column pseudo jumper 370 is partitioned into two separate inter-column jumper segments of equal length. FIG. 3E shows still another embodiment of column electrode matrix 300 including a plurality of inter-column pseudo jumper 370 having two discontinuities 394 applied to their structures. Discontinuities 394 are specifically disposed at regions substantially corresponding to first inter-column jumper endpoint 372 and second inter-column jumper endpoint 374. In this embodiment, first and second inter-column jumper end segments 382 and 384 are truncated, being separated at their distal ends from adjacent column conductors 316. Finally, FIG. 3F shows another embodiment of column electrode matrix 300 including a plurality of inter-column pseudo jumper 370 having a single discontinuity 394 applied to their structures. Specifically, discontinuity 394 is disposed at a region substantially corresponding to second inter-column jumper endpoint 374, truncating second inter-column jumper end segment 384, separating end segment 384 at its distal end from an adjacent column conductor 316.

With the inclusion of pseudo jumpers 370, the perceptibility of column electrode matrix 300, and in particular its jumpers 342, may be minimized. As described above, light propagating through intra-column regions (e.g., regions within column electrodes 302 and between column conductors 316) to a user may appear to have a reduced intensity due to occlusion of the light by jumpers 342 arranged in such inter-column regions. The perceptibility of such occlusion is exacerbated by the conversely higher light output in gaps 303 surrounding the intra-column regions, as such gaps are unoccluded by a jumper or other structure. By including pseudo jumpers 370, the reduced light output due to pseudo jumper/jumper pixel occlusion may be made spatially uniform throughout the two-dimensional region occupied by column electrode matrix 300. As such, the perceptibility of darker, occluded regions may be reduced or even eliminated as the perceptibility of such an artifact may depend on an electrode matrix having contrasting regions of light intensity. Further, the perceptibility of other artifacts described above, such as variously colored line segments and moiré patterns, may be reduced due to placement of pseudo jumpers 370 at oblique angles relative to horizontal and vertical pixel axes. Although pseudo jumpers 370 do not enhance the touch sensing functionality of an electrode matrix due to their segmented structure, the pseudo jumpers may conversely not interfere with the electrode matrix and reduce its touch sensing ability.

It will be appreciated that the above depicted embodiments, and particularly the depicted variations of discontinuities in inter-column jumpers, are exemplary in nature and not intended to limit the scope of this disclosure. Those of ordinary skill in the art will appreciate other variations in the formation and positioning of pseudo jumpers and discontinuities. As one non-limiting example, pseudo jumpers 370 may be positioned in a separate layer as isolated structures but positioned in-line with corresponding jumpers 342 such that artifact perceptibility is reduced as the electrode matrix is viewed by a user in a vertical direction.

As non-limiting examples, column electrodes 302 may be spaced apart from one another at pitches between 4-8 mm along the horizontal axis 313, column conductors 316 may be spaced apart from each other at pitches between 2-5 mm along the horizontal axis, and column segments (e.g., segments 320 and 322) may be alternately positioned at angles between 50°-70° and −50°-(−70°) relative to vertical axis 312. Column jumpers 342 may be spaced apart from one another by a pitch between 2-4 mm along vertical axis 312, and may comprise column jumper segments (e.g., segment 356) alternately positioned at angles between 15°-25° and −15°-(−25°) relative horizontal axis 313.

Figure 4A:
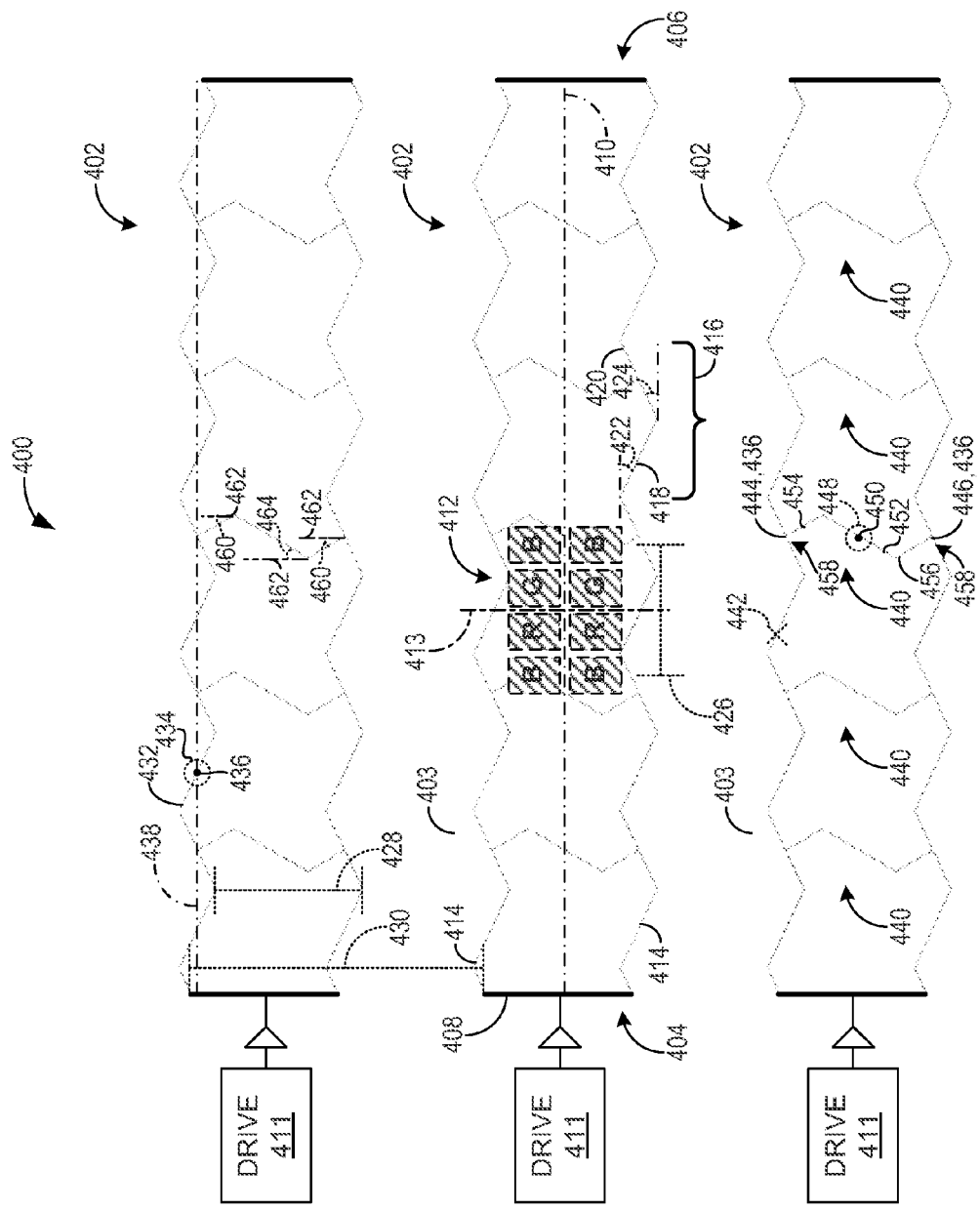
FIGS. 4A-B show schematic top views of a row electrode matrix in accordance with an embodiment of the present disclosure.

Turning now to FIG. 4A, an example of a row electrode matrix 400 is shown. Matrix 400 may be disposed in electrode layer 210 or 212 of FIG. 2 depending on the layer in which column electrode matrix 300 is formed, and may be formed via placement of discrete wires, material deposition, or material subtraction as described above.

In the depicted example, three row electrodes 402 are shown which, along with a plurality of additional row electrodes, may form row electrode matrix 400. Adjacent row electrodes 402 are separated by gaps 403. A row electrode 402 positioned at the center of row electrode matrix 400, for example, includes a first end 404 and a second 406 between which the structure of the electrode extends. First and second ends 404 and 406 may each correspond to a tie structure such as a terminal pad (e.g., terminal pad 408) electrically joining conductive segments forming row electrode 402, thereby creating a contiguous, conductive row electrode configured to sense touch input in cooperation with a corresponding column electrode 302. Each and every row electrode 402 in row electrode matrix 400 may sense touch input in cooperation with a corresponding column electrode 302 such that every column and row electrode in a touch sensor (e.g., touch sensor 208) forms a capacitor configured to sense touch input, as described in further detail below with reference to FIG. 5. Bottom terminal pads of each row electrode 402 (e.g., terminal pad 408) may be electrically coupled to respective drive circuits 411 configured to supply unique voltages to each of row electrodes 402, facilitating the detection of changes in capacitance between column and row electrodes as described in further detail below with reference to FIG. 5. Alternatively, the bottom terminal pads may be connected to a detection circuit also described in further detail below.

First and second ends 404 and 406 of row electrode 402 are formed along a central horizontal axis 410 extending from the first end to the second end. Horizontal axis 410 may be horizontal axis 313 of FIG. 3A, and may correspond to a horizontal axis of a plurality of pixels positioned below row electrode matrix 400 and its corresponding layer in a display stack. For example, a plurality of pixels disposed in display stack 214 of FIG. 2 may be substantially aligned (e.g., within 5°) to horizontal axis 410 of row electrodes 402 positioned in transmit electrode layer 212, the transmit electrode layer positioned vertically above display stack 214. Eight pixels 412 are shown as a non-liming example, aligned to horizontal axis 410 along their horizontal dimensions (e.g., widths). Pixels 412 are also aligned to a vertical axis 413 such that the pixels form a horizontally and vertically aligned grid, and, along with a plurality of additional pixels, form an underlying display as viewed in a direction substantially perpendicular to a plane of the display (e.g., along a direction extending into the page of FIG. 4A). Vertical axis 413 may be vertical axis 312 of FIG. 3A, for example. It will be understood that horizontal axis 410 and vertical axis 413 may facilitate relative positioning and may not be defined relative to a fixed reference point (e.g., a point on Earth)

Each row electrode 402 comprises a pair of spaced apart row conductors 414 which form the horizontal lengths of each row electrode and are joined by tie structures such as terminal pads (e.g., terminal pad 408) at left and right sides and other conductive electrode structures to form contiguous, conductive row electrodes. Row conductors 414 each include a row zigzag structure extending from first end 404 to second end 406, represented in part by a row zigzag structure portion 416. In this example, each row conductor includes the same zigzag structure, though alternative embodiments are possible in which more than one zigzag structure is used in a row electrode or row electrode matrix, including asymmetric arrangements. The overall row zigzag structure extends along horizontal axis 410 and oscillates back and forth across the horizontal axis, alternately comprising positively and negatively angled linear conductor segments. For reference, in row conductors 414 the zigzag structures turn positive as they angle upward toward the top of the page, and negative as they return downward toward the bottom of the page. For example, row zigzag structure portion 416 alternately includes a negatively angled row segment 418 positioned horizontally leftward and adjoined at a right endpoint to a left endpoint of a positively angled row segment 420. The overall row zigzag structure thus alternately includes negatively angled, linear row segments adjoined to positively angled, linear row segments at respective left and right endpoints.

Negatively angled row segment 418 and positively angled row segment 420 may be positioned at oblique angles relative to horizontal. An example of such oblique angles is represented by a negative row angle 422 and a positive row angle 424, formed relative to a horizontal axis such as horizontal axis 410. Negatively angled row segments (e.g., segment 418) may be positioned at negative row angle 422 relative to horizontal axis 410, while positively angled row segments (e.g., segment 420) may be positioned at positive row angle 424 relative to the horizontal axis. As non-limiting examples, angles 422 and 424 may be between 0° and +/−45°, and in particular between +/−15° and +/−35° for embodiments in which row electrodes are disposed vertically above an LCD display stack. Negative and positive row angles 422 and 424 in some embodiments may be equal and additive inverses of each other—for example, an angle θ of positive row angle 422 may be equal to an angle −θ of negative row angle 424 such that negatively angled row segments (e.g., segment 418) in row electrode 402 are a reflection about a vertical axis (e.g., vertical axis 413) of positively angled row segments (e.g., segment 420) in the row electrode.

As the negatively and positively angled row segments may be positioned at oblique angles relative to vertical axis 410, the row segments may be positioned obliquely relative to pixels in display stack 214 and the directions along which their horizontal dimensions extend (e.g., widths extending along vertical axis 410) as seen from a viewing direction substantially perpendicular to a plane (e.g., surface) of the display stack. As such, placement of row segments at oblique angles relative to horizontal axis 410 may reduce pixel occlusion and minimize the presence and visibility of the artifacts described above (e.g., variously colored line segments, moiré patterns, etc.).

Each row conductor 414 in row electrodes 402 may have a width (e.g., measured along a direction substantially perpendicular to a row electrode segment) that is small relative to a display pixel pitch. A pixel pitch 426 is shown as an illustrative example, extending from midpoints of adjacent blue pixels, separated by a red pixel and a green pixel. As non-limiting examples, the width of row conductors 414 may be less than 3%, 2%, or 1.5% of pixel pitch 426 in respective embodiments, as with column conductors 316. Further, row conductors 414 may have a thickness, as measured in a direction perpendicular to the layer in which they are disposed (e.g., perpendicularly from the surface of receive electrode layer 210), equal or less than the width of the row conductors. For example, this thickness may be 40% or 20% of the row conductor width in respective embodiments.

The lengths of each row segment (e.g., segments 418 and 420) may be equal, and as a non-limiting example may be 1.6 mm as measured along vertical axis 413. Further, conductors 414 in each electrode 402 may be separated by a common row conductor pitch 428, which may be, for example, 3 mm. Similar to pixel pitch 426, row conductor pitch 428 may be the vertical distance along vertical axis 413 between corresponding points on adjacent conductors 414. Each row electrode 402 may in turn be separated by a common row electrode pitch 430 which may be as a non-limiting example 6 mm. Row electrode pitch may be the vertical distance along vertical axis 413 between corresponding points on adjacent electrodes 402.

It will be appreciated that the dimensions described above, including row segment angles, row segment lengths, and row widths and thicknesses are provided as non-limiting examples and are selected based on a desired column electrode density and suited to characteristics (e.g., resolution) of a display stack above which the row electrode matrix is to be positioned. Such parameters may be varied without departing from the scope of this disclosure. For example, the number of row electrodes and row segments in each row conductor may vary depending on the resolution and size of the associated display stack. Moreover, although row electrodes 402 are shown having a partially rectangular shape augmented by oscillating zigzag structures, such rectangular profile may be varied without departing from the scope of this disclosure. Although row electrodes 402 are shown comprising pairs of row conductors 414, it will be understood that row electrodes may comprise three or more row conductors, and in some embodiments more than one row electrode may occupy a given horizontal region (e.g., row).

In the example shown in FIG. 4A, truncated, positively angled row segments 420 adjoin first and second ends 404 and 406 of each conductor 414. It will be noted that such the degree of such truncation may vary depending on various characteristics of the display device in which row electrode matrix 400 is to be disposed, for example the size and/or resolution of the display stack. In some embodiments, conductors 414 may adjoin first and second ends 404 and 406 at endpoints of negatively and/or positively angled row segments.

Continuing with FIG. 4A, row electrodes 402 and row conductors 414 may be horizontally aligned to horizontal axis 410 as a result of horizontal alignment of row segment midpoints. In particular, each row segment in each row electrode 402 may include a central region which may be aligned to a horizontal axis such as horizontal axis 410. The central region may substantially correspond (e.g., arranged concentrically) to a midpoint of a row segment. In some embodiments, the midpoints of each row segment in row electrodes 402 may be aligned to horizontal axis 410. FIG. 4A shows an exemplary column segment 432 including a central region 434 having a substantially circular shape. In this example, central region 434 corresponds to and is centered about a first midpoint 436 which characterizes the middle point of column segment 432. A midpoint vertical axis 438 illustrates the horizontal alignment of the central regions and midpoints of each row segment in this particular column electrode 402. It will be appreciated that midpoint horizontal axis 438 may be a transposed instance of horizontal axis 410, and that row segments for a given row conductor and row electrode may be aligned about other points within central region 434 including those other than first midpoint 436. Alternatively, points along row segments outside of central region 434 may be aligned to midpoint vertical axis 438.

Each row electrode 402 further includes a plurality of row tie-structures or jumpers 440. Row jumpers 440 are electrically conductive structures configured to electrically bridge adjacent row conductors 414 in a given row electrode 402 (e.g., adjacent pairs of row electrodes) and facilitate touch sensing at a sufficient accuracy and speed even in the presence of defects in the structure of the row conductors. One example of such a defect is a pinhole discontinuity defect described above. FIG. 4A shows an example pinhole defect 442 which has appeared in a central region of a negatively angled row segment 418 of a row conductor 414 at a top side of a row electrode 402 at a bottom region of row electrode matrix 400. Although current is unable to traverse defect 442 and travel through its corresponding row conductor portion, current may shunt around and bypass the defect by routing through adjacent row jumpers 440 at left and right sides. In this way, spatially sufficient touch sensing may be provided by an electrode matrix having a plurality of defects.

Similar to row conductors 414, row jumpers 440 include a row jumper zigzag structure extending between a first column jumper endpoint 444 and a second column jumper endpoint 446. First row jumper endpoint 444 is electrically adjoined to a respective first midpoint 436 of an adjacent positively angled row segment 420 (e.g., in a top row conductor 414), and second row jumper endpoint 446 is likewise electrically adjoined to a respective first midpoint 436 of an adjacent positively angled row segment 420 (e.g., in a bottom row conductor 414). First and second column jumper endpoints 444 and 446 may be vertically aligned along vertical axis 413, for example. Other configurations are possible, however, such as those in which row jumpers electrically bridge negatively angled row segments, negatively angled and positively angled row segment pairs, and those in which the first and second row jumper endpoints are not aligned along a vertical axis. Further, in some embodiments, row jumpers 440 may adjoin regions of row segments other than first midpoint 436—e.g., within central region 434 but away from the first midpoint.

Row jumpers 440 further include a row jumper central region 448 which includes a row jumper midpoint 450. Row jumper central region 448 may substantially correspond (e.g., arranged concentrically) to row jumper midpoint 450, which may be vertically aligned with first and second row jumper endpoints 444 and 446. Endpoints 444 and 446, and midpoint 450, may be collectively aligned along vertical axis 413.

In this embodiment, the row jumper zigzag structure extending between first and second row jumper endpoints 444 and 446 includes three row jumper segments alternately angled at positive and negative angles about a vertical axis (e.g., vertical axis 413), similar to the row conductor zigzag structure described above. In particular, each row jumper 440 includes a row jumper middle segment 452, to which row jumper central region 448 and row jumper midpoint 450 correspond. Middle segment 452 is surrounded by and adjoined to on a top side a first row jumper end segment 454, and on a bottom side a second row jumper end segment 456. End segments 454 and 456 each include a row jumper distal end 458, each of which respectively include first and second row jumper endpoints 444 and 446, at which the row jumpers 440 are connected to adjacent portions of row conductors 414.

Although the inclusion of row jumpers 440 may facilitate sufficient touch sensing in the presence of discontinuity defects, their presence may occlude vertically aligned pixels in a display stack disposed below row electrode matrix 400, creating artifacts as described above. To reduce pixel occlusion and minimize the perceptibility of occlusion artifacts, the column jumper zigzag structure may be disposed obliquely relative to pixels therebelow. In the embodiment shown in FIG. 4A, first row jumper end segment 454, row jumper middle segment 452, and second row jumper end segment 456 are alternately arranged at negative and positive oblique angles relative to vertical. Such angles are shown for a particular row jumper 440 in an upper row electrode 402; first row jumper end segment 454 forms a negative column angle 460 with a vertical axis 462, row jumper middle segment 452 forms a positive column angle 464 with vertical axis 462, and second row jumper end segment 456 forms negative column angle 460 with vertical axis 462. Vertical axis 462 may be a transposition of vertical axis 413, for example. It will be appreciated that other embodiments are possible in which first and second row jumper end segments 454 and 456 form different angles with horizontal axis 462.

As non-limiting examples, negative row angle 460 may be 30°, and positive row angle 464 may be −30° (120°, alternatively), while the pitch of first row jumper end segment 454, row jumper middle segment 452, and second row jumper end segment 456, as measured along vertical axis 413, may be 0.75 mm, 1.5 mm, and 0.75 mm, respectively. Such angles and pitches may be adjusted without departing from the scope of this disclosure, however, and may be selected based on various characteristics desired of the touch-sensitive display device in which the column electrodes are to be positioned, including but not limited to display and touch-sensing resolution. As each segment of row jumpers 440 may be positioned obliquely relative to vertical axis 413 and to pixels in a display stack as viewed in a direction substantially perpendicular to the surface of row electrode matrix 400 and the display stack, the perceptibility of artifacts resulting from pixel occlusion by the column jumpers may be reduced. In this way, touch sensing may be sufficiently performed in the presence of electrical discontinuity defects in an electrode matrix without significantly reducing the quality of images displayed by a display stack positioned below the electrode matrix and reducing the quality of user experience.

Figure 4B:
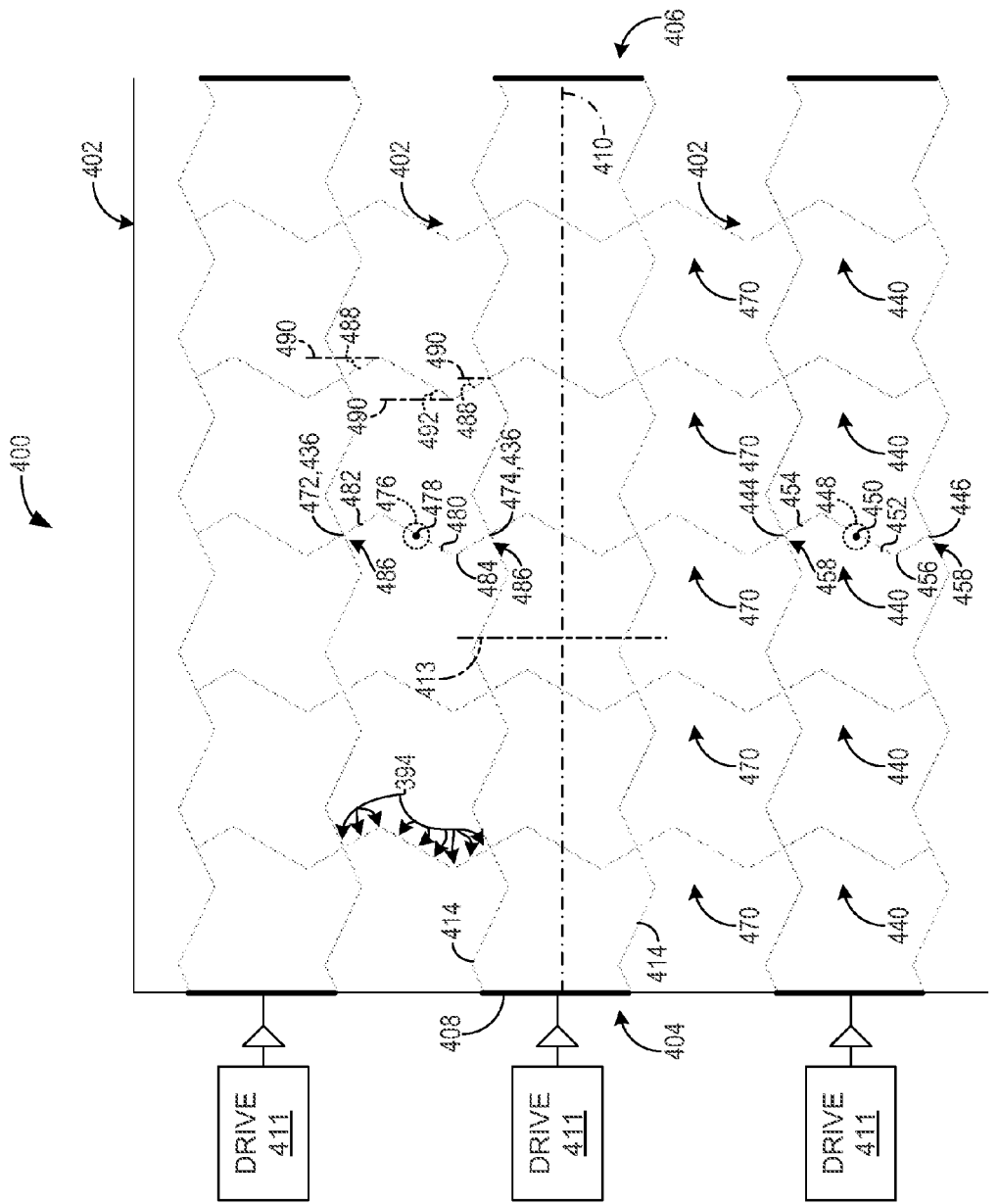

Although positioning row jumper segments at oblique angles relative to underlying pixels and their horizontal and vertical axes may reduce the perceptibility of artifacts resulting from occlusion of the pixels by the jumper segments, some artifacts may remain perceptible to a degree by some users in certain scenarios. As described above, while obliquely positioned column jumpers may render the appearance of variously colored lines and moiré patterns proximate the column jumpers substantially imperceptible, the underlying pixels which are vertically occluded by the row jumpers may appear darker than surrounding unoccluded pixels as the amount of light transmitted from the occluded pixels to a user is reduced. FIG. 4B shows an embodiment of row electrode matrix 400 including a plurality of isolated inter-row pseudo jumpers 470, which may be used to reduce the difference in light output between occluded and unoccluded pixels, in turn reducing the perceptibility of an electrode matrix and its constituent structures.

In the depicted embodiment, inter-row pseudo jumpers 470 have a structure substantially similar to that of row jumpers 440, though it will be appreciated that their structures may be varied in an asymmetric manner. In particular, inter-row pseudo jumpers 470 include an inter-row zigzag structure extending between a first inter-row jumper endpoint 472 and a second inter-row jumper endpoint 474. The pseudo jumpers are configured to be non-conductive across their entire lengths (e.g., end to end) as described above, such that the endpoints 472, 474 are not conductively connected by the pseudo jumper. In some cases conductive material may be used to form the pseudo jumpers, and thus individual isolated portions of the pseudo jumpers may be conductive; however, the jumpers as a whole do not form a conductive path between their respective endpoints. In other embodiments, the pseudo jumpers may be formed of an opaque non-conductive material.

First inter-row jumper endpoint 472 is adjoined to a respective first midpoint 436 of an adjacent positively angled row segment 420 (e.g., in an upper row conductor 414), and second inter-row jumper endpoint 474 is likewise adjoined to a respective first midpoint 436 of an adjacent positively angled row segment 420 (e.g., in a bottom row conductor 414). First and second inter-row jumper endpoints 472 and 474 may be vertically aligned along vertical axis 413, for example, and may also be vertically aligned with first and second column row endpoints 444 and 446 of corresponding row jumpers 440 substantially occupying the same vertical region (e.g., column) in which the inter-row pseudo jumpers 470 are positioned. In such a case, row jumpers 440 and inter-row pseudo jumpers 470 may be substantially aligned along a vertical axis to reduce the difference in brightness between occluded and unoccluded pixels and thus reduce the perceptibility of such difference. Other configurations are possible, however, such as those in which first and second inter-row jumper endpoints 472 and 474 are adjoined to other points along positively angled column segments 420 or are adjoined to points (e.g., midpoints) along negatively angled column segments 418, particularly in embodiments in which row jumpers 440 also adjoin to negatively angled row segments at their endpoints.

Inter-row pseudo jumpers 470 further include an inter-row jumper central region 476 which includes an inter-row jumper midpoint 478. Inter-row jumper central region 476 may substantially correspond (e.g., arranged concentrically) to inter-row jumper midpoint 478, which may be vertically aligned with first and second inter-row jumper endpoints 472 and 474, and also with corresponding row jumper midpoints 450. Endpoints 472 and 474, and midpoint 478, may be collectively aligned along vertical axis 413, for example.

In this embodiment, the inter-row jumper zigzag structure extending between first and second inter-row jumper endpoints 472 and 474 includes three inter-row jumper segments alternately angled at negative and positive angles about a vertical axis (e.g., vertical axis 413), similar to the row jumper zigzag structure and the inter-column jumper zigzag structure (rotated substantially 90°) described above. In particular, each inter-row pseudo jumper 470 includes an inter-row jumper middle segment 480, to which inter-row jumper central region 476 and inter-row jumper midpoint 478 correspond. Middle segment 480 is surrounded by and adjoined to on an upper side a first inter-row jumper end segment 482, and on a lower side a second inter-row jumper end segment 484. End segments 482 and 484 each include a row jumper distal end 486, each of which respectively include first and second inter-row jumper endpoints 472 and 474, at which the inter-row pseudo jumpers 470 are connected to adjacent portions of row conductors 414.

Like row jumpers 440, first inter-row end segment 482, inter-row jumper middle segment 480, and second inter-row end segment 484 are alternately arranged at negative and positive oblique angles relative to a vertical axis (e.g., vertical axis 413). Such angles are shown for a particular inter-row pseudo jumper 470 in an inter-row region interposed between a central row electrode 402 and an upper row electrode 402; first inter-row jumper end segment 482 forms a negative column angle 488 with a vertical axis 490, inter-row jumper middle segment 480 forms a positive column angle 492 with vertical axis 490, and second inter-row end segment 484 forms negative column angle 488 with vertical axis 490. Vertical axis 490 may be a transposition of vertical axis 413, for example. It will be appreciated that other embodiments are possible in which first and second row jumper end segments 482 and 484 form different angles with vertical axis 490.

As non-limiting examples, negative column angle 488 may be 30°, and positive row angle 492 may be −30° (120°, alternatively), while the pitch of first inter-row jumper end segment 482, inter-row jumper middle segment 480, and second inter-row jumper end segment 484, as measured along vertical axis 490, may be 0.75 mm, 1.5 mm, and 0.75 mm, respectively, corresponding to the respective angles and pitches of row jumpers 440. Such angles and pitches may be adjusted without departing from the scope of this disclosure, however, and may be selected based on various characteristics desired of the touch-sensitive display device in which the row electrodes are to be positioned, including but not limited to display and touch-sensing resolution. Further, the angles and/or pitches of inter-row pseudo jumpers 470 may vary compared to those of row jumpers 440 in some embodiments.

As with inter-column pseudo jumper 370 described above with reference to FIGS. 3B-3F, inter-row pseudo jumpers 470 are electrically isolated from adjacent conductive structures (e.g., row jumpers 440, conductors 414) and configured not to transmit electrical current throughout their structures or those to which they are adjoined. Discontinuities such as gaps 394 may be applied to inter-row pseudo jumpers 470 to interrupt an otherwise contiguous conductive pathway, isolate the jumpers, and render the pseudo jumpers electrically non-conductive. As with inter-column pseudo jumper 370, inter-row pseudo jumpers 470 are positioned in regions between adjacent row electrodes 402, and in the depicted embodiment vertically aligned with row jumpers occupying the same vertical region (e.g., column), columns of row jumpers and inter-row jumpers may appear substantially contiguous. Although the jumpers may not be optically resolvable, their perceptibility may be reduced as the difference in light output between occluded and unoccluded pixels is made less apparent.

One approach in which discontinuities are applied to inter-row pseudo jumpers 470 is shown in FIG. 4B; here, discontinuities 394 perforate the pseudo jumpers along their entire lengths (e.g., the sum of the lengths of the end and middle segments). Other approaches, however, are possible, including those in which discontinuities are applied as shown in FIGS. 3C-3F. In these embodiments, one or more discontinuities may be applied at inter-row segment inflection points, inter-row segment central regions or midpoints, proximate inter-row end segment endpoints, etc.

It will be appreciated that the above depicted embodiments, and particularly the depicted variations of discontinuities in inter-row pseudo jumpers, are exemplary in nature and not intended to limit the scope of this disclosure. Those of ordinary skill in the art will appreciate other variations in the formation and positioning of discontinuities in inter-row pseudo jumpers. Moreover, in some embodiments, inter-row pseudo jumpers 470 may be positioned in a separate layer as isolated structures but positioned in-line with corresponding jumpers 440 such that artifact perceptibility is reduced as the electrode matrix is viewed by a user in a vertical direction.

As non-limiting examples, row electrodes 402 may be spaced apart from one another at pitches between 3-7 mm along vertical axis 312, row conductors 414 may be spaced apart from each other at pitches between 1-4 mm along the vertical axis, and linear row segments (e.g., segments 418 and 420) may be alternately positioned at angles between 15°-35° and −15°-(−35°) relative to horizontal axis 410. Row jumpers 440 may be spaced apart from one another by a pitch between 2-4 mm along the horizontal axis 410, and may comprise row jumper segments (e.g., segment 454) alternately positioned at angles between 50°-70° and −50°-(−70°) relative to vertical axis 413.

Turning now to FIG. 5, an embodiment of a capacitive electrode matrix 500 configured to sense touch input is shown. In particular, a plan view of matrix 500 is shown, comprising column electrode matrix 300 positioned vertically above row electrode matrix 400. Column electrode matrix 300 may be formed in receive electrode layer 210 of touch sensor 208, while row electrode matrix 400 may be formed in transmit electrode layer 212, for example. The matrices may form part of a touch sensor included in a suitable display device (e.g., LCD, OLED, AMOLED, plasma, etc.).

Matrix 500 includes drive circuits 502 configured to respectively drive each of row electrodes 402 in row electrode matrix 400 with unique, time varying voltages while column electrodes 302 in column electrode matrix 300 are held at ground. A respective capacitor 504 is formed at intersecting regions between each column electrode 302 and row electrode 402. In response to a touch input applied by a user's digit or other device such as a stylus, the capacitance of at least one capacitor 504 may change. This change may be detected by one or more detection circuits 506 coupled to each of column electrodes 302 and evaluated to interpret the touch input and determine its location based on, for example, the phase shift and/or attenuation in the received signal. It will be noted that the drive circuits 502 may instead be connected to column electrodes 302 in column electrode matrix 300 and the detection circuits 506 may be connected to row electrodes 402 in row electrode matrix 400 without departing from the scope of this disclosure. Drive circuits 502 and detect circuits 506 may be collectively referred to as "control electronics".

FIG. 5 also shows the relative positioning between column electrodes 302 and row electrodes 402 and various points of intersection as viewed from a vertical direction 508 (extending out of the page of FIG. 5). In this embodiment, column electrodes 302 (e.g., column segment midpoints 338) are substantially aligned (e.g., within 5)° to vertical axis 312, while row electrodes 402 (e.g., row segment midpoints 436) are substantially aligned (e.g., within 5°) to horizontal axis 410. It will be appreciated, however, that the alignment of column and row electrodes 302 and 402 to vertical axis 312 and horizontal axis 410 may be varied to produce angular deviations between the electrodes and their respective axes, and more particularly, between column segments and row segments and their respective axes. Further, such angular deviation may vary among column and row electrodes—e.g., adjacent column electrodes may be aligned to different degrees to the same vertical axis. The zigzag structure of each column conductor 316 cross the zigzag structure of each row conductor 414 at respective crossing regions (e.g., crossing region 510). The crossing regions are formed at intersection of vertical axis 312 and horizontal axis 410. Although a single instance of each of vertical and horizontal axes 312 and 410 are shown, it will be appreciated that a vertical axis may be associated with each and every column electrode 302 in column electrode matrix 300 and that a horizontal axis may be associated with each and every row electrode 402 in row electrode matrix 400 such that the intersections between each and every vertical and horizontal axis forms a respective crossing region 510. More particularly in this embodiment, first midpoints 338 of each negatively angled column segment 322 substantially overlap (e.g., visually intersect) second midpoints 436 of each negatively angled row segment 418 as seen from vertical direction 508. The intersections formed by such overlap may be at oblique angles as with the oblique intersection described above with reference to column electrodes 302 and row electrodes 402. In some embodiments, however, other regions of column and row segments may overlap. For example, midpoints of column segments may overlap regions of row segments which are closer to one of the endpoints of the row segments.

FIG. 5 also shows how column jumpers 342 may be disposed vertically between adjacent pairs of row conductors 414, or, between adjacent row electrodes 402. Likewise, row jumpers 440 may be horizontally disposed between adjacent pairs of column conductors 316, or, between adjacent column electrodes 302. Further, each column jumper midpoint 352 intersects a row jumper midpoint 450 or an inter-row jumper midpoint 478 depending on its position in matrix 500. Likewise, each row jumper midpoint 450 intersects a column jumper midpoint 352 or an inter-column jumper midpoint 478 depending on its position in matrix 500. Intersection between column jumpers, or inter-column jumpers, and row jumpers, or inter-row jumpers, at their midpoints may be at oblique angles as described above (e.g., 90°+/−10°).

Each column jumper 342, inter-column pseudo jumper 370, row jumper 440, and inter-row pseudo jumper 470 may intersect surrounding electrode structures at three-way intersections, also at oblique angles. For example, FIG. 5 shows a three-way column intersection region 512 in which an inter-column pseudo jumper 370 intersects a positively angled column segment 320 at a left side (at column segment midpoint 338 and first inter-column jumper endpoint 372), an inter-row pseudo jumper 470 at midpoints 378 and 478, and a second positively angled column segment 320 at a right side (at column segment midpoint 338 and second inter-column jumper endpoint 374). Such intersections may be at one or more oblique angles (e.g., 90°+/−10°). Similar three-way intersection also applies to column jumpers 342, row jumpers 440, and inter-row pseudo jumpers 470. A row intersection region 514 denotes a region in which an inter-row pseudo jumper 470 engages in a three-way intersection with positively angled row segments and a column jumper middle segment.

In embodiments of electrode matrix 500 which exhibit various types of symmetry, column and row jumpers may also exhibit various kinds of symmetry. As shown in FIG. 5 for example, for each column jumper 342, first and second column jumper end segments 356 and 358, and column jumper middle segment 354, are reflections about horizontal axis 410 of respective, vertically-aligned portions of adjacent row conductors 414. For each inter-column pseudo jumper 370, the corresponding first, second, and middle segments are also horizontal reflects of respective, vertically-aligned portions of adjacent row conductors 414. Likewise, for each row jumper 440, first and second row jumper end segments 454 and 456, and row jumper middle segment 452, are reflections about vertical axis 312 of respective, horizontally-aligned portions of adjacent column conductors 316. For each inter-row pseudo jumper 470, the corresponding first, second, and middle segments are also vertical reflections of respective, horizontally-aligned portions of adjacent column conductors 316.

Although three column and row electrodes 302 and 402 are shown in the example embodiment depicted in FIG. 5, it will be appreciated that these electrodes may form a capacitive, touch-sensitive electrode matrix along with a plurality of additional column and row electrodes. Such number will vary depending on implementation and may be selected based on various desired characteristics, such as touch-sensing resolution and resolution of a display device above which the capacitive electrode matrix is to be positioned.

As seen in FIG. 5, jumpers and their pseudo jumper counterparts may exhibit certain symmetries (e.g., jumpers 342 and pseudo jumpers 370, and jumpers 440 and pseudo jumpers 470). For example, the pseudo jumpers may have a substantially similar size and/or shape as their jumper counterparts (e.g., within 5%). Jumpers and pseudo jumpers may have the same spatial density—e.g., the number of jumpers and pseudo jumpers per unit area of electrode matrix 500 may be the same. Further, pseudo jumpers may be positioned in-line with corresponding jumpers in adjacent electrodes. For example, pseudo jumpers 370 are positioned horizontally in-line in column electrode matrix 300 with corresponding jumpers 342 in adjacent column electrodes 300.

It will be further appreciated that the embodiments disclosed above may be adapted to other capacitive touch sensors other than those depicted—e.g., capacitive touch sensors which do not measure capacitance from columns to rows.

Example 1

In one non-limiting example embodiment, the electrode matrix comprises a column electrode film laminated to a row electrode film. The two electrode films are bonded together by a 50 μm thick, optically clear, acrylic, pressure sensitive adhesive film.

Each electrode film comprises a 100 μm thick, optically clear, biaxially-oriented poly(ethylene terephthalate) film coated with an approximately 1.5 μm thick layer of copper that is chemically treated to minimize optical reflection, then photo-etched to form an array of column or row electrodes. Alternatively, a coating may be deposited to reduce optical reflection.

In this example, the column electrode film is substantially rectangular, and 2000×1180 mm in size. It includes a 300×1 array of column electrodes, collectively occupying a rectangular sensing region of 1920×1092 mm. Each column electrode occupies a rectangular region of approximately 4.2× 1092 mm. The column electrodes are spaced on a 6.4 mm pitch along the X (e.g., horizontal) direction, and each spans the entire Y (e.g., vertical) dimension of the sensing area.

In this example, the row electrode film is rectangular, 2000×1118 mm in size. It contains a 1×182 array of row electrodes, collectively occupying a rectangular sensing region of 1920×1092 mm. Each row electrode occupies a rectangular region of approximately 1920×4.2 mm. The row electrodes are spaced on a 6 mm pitch along the Y direction, and each spans the entire X dimension of the sensing area.

Each column electrode consists of a ladder-like network of zigzagging copper column conductors of 10 μm nominal width. Two identical, parallel, long zigzagging column conductors are each comprised of 728 linear column segments of equal length, alternately positioned at angles of 60° and −60° relative to horizontal (30° and −30° relative to vertical); each linear column segment extends 1.5 mm along the Y direction. The two long zigzagging column conductors have a column pitch, being spaced 3.2 mm apart along the X axis. The two long zigzagging column conductors are connected to each other by 363 identical short zigzagging column jumpers. The short zigzagging column jumpers are separated by a 3 mm pitch along the Y direction. Each short zigzagging column jumper is comprised of 3 linear column jumper segments positioned at angles relative to horizontal of 25°, −25°, and 25°, respectively, and extend 0.8 mm, 1.6 mm, and 0.8 mm, respectively, along the X direction. The short zigzagging column jumpers connect to the long zigzagging column conductors at the midpoints of each −60° column segment, such that they meet with minimum obliquity in a three-way intersection.

Each row electrode consists of a ladder-like network of zigzagging copper row conductors of 10 μm nominal width. Two identical, parallel, long zigzagging row conductors are each comprised of 1200 linear row segments of equal length, alternately positioned at angles of 25° and −25° relative to horizontal; each linear row segment extends 1.6 mm along the X direction. The two long zigzagging row conductors are spaced at a row conductor pitch of 3 mm apart along the Y axis. The two long zigzagging row conductors are connected to each other by 599 identical short zigzagging row jumpers. The short zigzagging row jumpers are arrayed on a 3.2 mm pitch along X direction. Each short zigzagging row jumper is comprised of 3 linear row segments positioned at angles relative to horizontal of 60°, −60°, and 60° (30°, −30°, and 30° relative to vertical), respectively, and extend 0.75 mm, 1.5 mm, and 0.75 mm, respectively, along the Y direction. The short zigzagging row jumpers connect to the long zigzagging row conductors at the midpoints of each −25° linear row segment, such that they meet with minimum obliquity in a three-way intersection.

Electrically isolated inter-column jumpers occupy the regions between the column electrodes, providing an occlusion of display pixels approximately equivalent to the occlusion caused by the short zigzagging column jumpers within the column electrodes. The inter-column structures are arranged in a 299×363 array of elements on 6.4 mm (X direction)×3 mm (Y direction) pitch. Each inter-column jumper is similar to a short zigzagging column jumper, except that it is broken into 8 line segments, of approximately equal length, by 100 μm gaps. No segment is electrically connected to any column electrode, or to any other segment.

Electrically isolated inter-row jumpers occupy the regions between the row electrodes, providing an occlusion of display pixels approximately equivalent to the occlusion caused by the short zigzagging row jumpers within the row electrodes. The inter-row structures are arranged in a 599×181 array of elements on 3.2 mm (X direction)×6 mm (Y direction) pitch. Each inter-row jumper is similar to a short zigzagging row jumper, except that it is broken into 8 line segments, of approximately equal length, by 100 μm gaps. No segment is electrically connected to any row electrode, or to any other segment.

In the assembled electrode matrix, viewed along the Z direction, the sensing region of the column electrode film is nominally coincident with the sensing region of the row electrode film. The midpoints of the 60° line segments of the column conductors are nominally coincident with the midpoints of the −25° line segments of the row conductors, so that all column electrode linear column segments that cross row electrode linear row segments do with minimum obliquity.

It will be appreciated that the above example embodiment is provided for illustrative purposes and is not intended to be limiting in any way. The physical parameters and dimensions may be adjusted without departing from the scope of this disclosure. As an additional non-limiting example, column electrodes may be spaced apart from one another at pitches between 4-8 mm along the X direction, column conductors in each column electrode may be spaced apart from each other at pitches between 2-5 mm along the X direction, and linear column segments may be alternately positioned at angles between 50°-70° and −50°-(−70°) relative to the Y direction. Column jumpers may be spaced apart from one another by a pitch between 2-4 mm along the Y direction, and may comprise segments alternately positioned at angles between 15°-25° and −15°-(−25°) relative to the X direction. As further non-limiting examples, row electrodes may be spaced apart from one another at pitches between 3-7 mm along the Y direction, row conductors in each row electrode may be spaced apart from each other at pitches between 1-4 mm along the Y direction, and linear row segments may be alternately positioned at angles between 15°-35° and −15°-(−35°) relative to the X direction. Row jumpers may be spaced apart from one another by a pitch between 2-4 mm along the X direction, and may comprise segments alternately positioned at angles between 50°-70° and −50°-(−70°) relative to the Y direction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
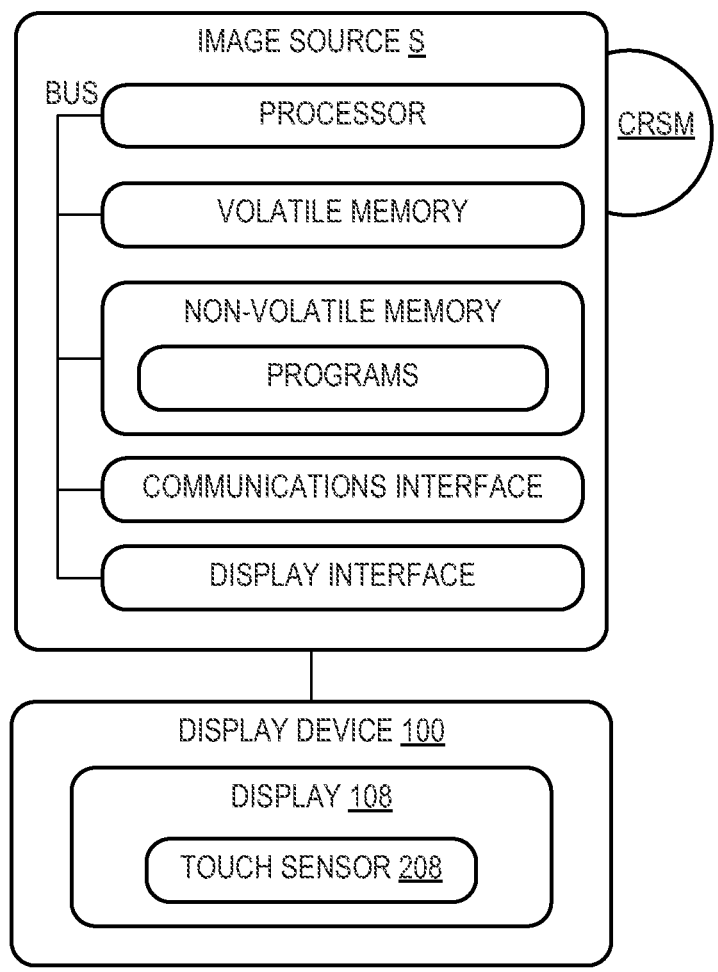
FIG. 6 is a schematic view of an image source for the display device of FIG. 1.

FIG. 6 illustrates an exemplary image source S according to one embodiment of the present invention. As discussed above, image source S may be an external computing device, such as a server, laptop computing device, set top box, game console, desktop computer, tablet computing device, mobile telephone, or other suitable computing device. Alternatively, image source S may be integrated within display device 100.

Image source S includes a processor, volatile memory, and non-volatile memory, such as mass storage, which is configured to store software programs in a non-volatile manner. The stored programs are executed by the processor using portions of volatile memory. Input for the programs may be received via a variety of user input devices, including touch sensor 208 integrated with display 108 of display device 100. The input may be processed by the programs, and suitable graphical output may be sent to display device 100 via a display interface for display to a user.

The processor, volatile memory, and non-volatile memory may be formed of separate components, or may be integrated into a system on a chip, for example. Further the processor may be a central processing unit, a multi-core processor, an ASIC, system-on-chip, or other type of processor. In some embodiments, aspects of the processor, volatile memory and non-volatile memory may be integrated into devices such as field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

A communications interface may also be provided to communicate with other computing devices, such as servers, across local and wide area network connections, such as the Internet.

The non-volatile memory may include removable media and/or built-in devices. For example, non-volatile memory may include optical memory devices (e.g., CD, DVD, HD-DVD, Blu-Ray Disc, etc.), semiconductor memory devices (e.g., FLASH, EPROM, EEPROM, etc.) and/or magnetic memory devices (e.g., hard disk drive, floppy disk drive, tape drive, MRAM, etc.), among others.

Removable computer readable storage media (CRSM) may be provided, which may be used to store data and/or instructions executable to implement the methods and processes described herein. Removable computer-readable storage media may take the form of CDs, DVDs, HD-DVDs, Blu-Ray Discs, EEPROMs, and/or floppy disks, among others.

Although the non-volatile memory and CRSM are physical devices configured to hold instructions for a duration of time, typically even upon power down of the image source, in some embodiments, aspects of the instructions described herein may be propagated by a computer readable communication medium, such as the illustrated communications bus, in a transitory fashion by a pure signal (e.g., an electromagnetic signal, an optical signal, etc.) that is not held by a physical device for at least a finite duration.

The term "program" may be used to describe software firmware, etc. of the system that is implemented to perform one or more particular functions. In some cases, such a program may be instantiated via the processor executing instructions held by non-volatile memory, using portions of volatile memory. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The embodiments described above and the embodiments illustrated in the drawings serve as examples of the variety of different devices. The subject matter of the present disclosure includes all novel and nonobvious combinations and subcombinations of the various configurations, features, functions, and/or properties disclosed herein, as well as any and all equivalents thereof.

The invention claimed is:

1. An electrode matrix for a capacitive touch-sensing display device, comprising:
   a column electrode array including a plurality of column conductors, each column conductor having a first end and a second end formed along a central longitudinal axis of the column conductor, the column conductor further including a column zigzag structure extending between the first end and second end, the column zigzag structure oscillating back and forth across the longitudinal axis, the plurality of column conductors substantially aligned to the central longitudinal axis;
   a row electrode array including a plurality of row conductors, each row conductor having a first end and a second end formed along a central lateral axis of the row conductor, the row conductor further including a row zigzag structure extending between the first end and second end, the row zigzag structure oscillating back and forth across the lateral axis, the plurality of row conductors substantially aligned to the central lateral axis;

for each column electrode, two or more column jumpers electrically bridging the column conductors of that column electrode, the two or more column jumpers having a column jumper zigzag structure;

for each row electrode, two or more row jumpers electrically bridging the row conductors of that row electrode, the two or more row jumpers having a row jumper zigzag structure; and a plurality of pseudo jumpers positioned between adjacent column electrodes and between adjacent row electrodes, the plurality of pseudo jumpers configured to be non-conductive across their entire lengths, wherein the zigzag structure of each of the plurality of column conductors crosses the zigzag structure of each of the plurality of row conductors in respective crossing regions that are formed at an intersection of the longitudinal axis of each column conductor and lateral axis of each row conductor.

2. The electrode matrix of claim 1, wherein the column zigzag structure and the row zigzag structure include linear conductor segments, each of the linear conductor segments being formed at one or more angles relative to one or both of the lateral axis and the longitudinal axis, the lateral axis and the longitudinal axis corresponding to a plurality of pixels forming an underlying display as viewed in a direction substantially perpendicular to a plane of the display.

3. The electrode matrix of claim 1, wherein the column zigzag structure includes a plurality of column segments each having a column central region including a first midpoint, each of the column central regions substantially aligned to the longitudinal axis; and wherein the row zigzag structure includes a plurality of row segments each having a row central region including a second midpoint, each of the row central regions substantially aligned to the lateral axis.

4. The electrode matrix of claim 3, wherein the plurality of column segments alternately includes a positively angled column segment and a negatively angled column segment each having the first midpoint, the column segments angled relative to the longitudinal axis, wherein the plurality of row segments alternately includes a positively angled row segment and a negatively angled row segment each having the second midpoint, the row segments angled relative to the lateral axis; and wherein the first midpoint of the negatively angled column segment substantially overlaps the second midpoint of the negatively angled row segment.

5. The electrode matrix of claim 4, wherein a length of the positively angled column segment is equal to a length of the negatively angled column segment;

wherein a length of the positively angled row segment is equal to a length of the negatively angled row segment;

wherein an angle of the positively angled column segment is an additive inverse of an angle of the negatively angled column segment; and wherein an angle of the positively angled row segment is an additive inverse of an angle of the negatively angled row segment.

6. The electrode matrix of claim 1, wherein for each row electrode, the two or more row jumpers extend longitudinally across the row conductors of that row electrode, and wherein for each column electrode, the two or more column jumpers extend laterally across the column conductors of that column electrode.

7. The electrode matrix of claim 6, wherein the column zigzag structure alternately includes a positively angled column segment and a negatively angled column segment each having a first midpoint;

wherein the row zigzag structure alternately includes a positively angled row segment and a negatively angled row segment each having a second midpoint;

wherein each column jumper includes a first column jumper endpoint and a second column jumper endpoint, the first and the second column jumper endpoint each electrically connected to a respective first midpoint of the negatively angled column segment; and wherein each row jumper includes a first row jumper endpoint and a second row jumper endpoint, the first and the second row jumper endpoint each electrically connected to a respective second midpoint of the positively angled row segment.

8. The electrode matrix of claim 7, wherein each column jumper includes a column jumper midpoint;

wherein each row jumper includes a row jumper midpoint; and wherein the column jumper midpoint overlaps the row jumper midpoint at an angle.

9. The electrode matrix of claim 8, wherein the column jumper midpoint corresponds to a column jumper middle segment surrounded by a first column jumper end segment and a second column jumper end segment, the first and the second column jumper end segment each having a distal end, the distal end of the first and the second column jumper end segment including the first and the second column jumper endpoint, respectively; and wherein the row jumper midpoint corresponds to a row jumper middle segment surrounded by a first row jumper end segment and a second row jumper end segment, the first and the second row jumper end segment having a distal end, the distal end of the first and the second row jumper end segment including the first row jumper endpoint and the second row jumper endpoint, respectively.

10. The electrode matrix of claim 9, wherein the first and the second column jumper end segments, and the column jumper middle segment are reflections about the lateral axis of respective longitudinally-aligned portions of adjacent row conductors; and wherein the first and the second row jumper end segments, and the row jumper middle segment, are reflections about the longitudinal axis of respective laterally-aligned portions of adjacent column conductors.

11. A touch sensitive display device, comprising:

a display grid including a plurality of pixel rows substantially aligned to a lateral axis, and a plurality of pixel columns substantially aligned to a longitudinal axis;

a column electrode array including a plurality of column conductors each extending substantially along the longitudinal axis and spaced apart a column conductor distance, each column conductor alternately including a plurality of positively angled column segment and negatively angled column segment pairs, each positively angled column segment and negatively angled column segment having a column segment midpoint, and angled relative to the longitudinal axis;

a row electrode array including a plurality of row conductors each extending substantially along the lateral axis and spaced apart a row conductor distance, each row conductor alternately including a plurality of positively angled row segment and negatively angled row segment pairs, each positively angled row segment and negatively angled row segment having a row segment midpoint and angled relative to the lateral axis;

for each column electrode, two or more column jumpers electrically bridging the column conductors of that column electrode, the two or more column jumpers having a column jumper zigzag structure;

for each row electrode, two or more row jumpers electrically bridging the row conductors of that row electrode, the two or more row jumpers having a row jumper zigzag structure; and a plurality of pseudo jumpers positioned between adjacent column electrodes and between adjacent row electrodes, the plurality of pseudo jumpers configured to be non-conductive across their entire lengths, wherein the column segment midpoint of each negatively angled column segment visually intersects the row segment midpoint of each negatively angled row segment from a viewing direction substantially perpendicular to a plane of the display grid.

12. The display device of claim 11, wherein for each column electrode, the two or more column jumpers extend laterally across the column conductors of that column electrode, and wherein for each row electrode, the two or more row jumpers extend longitudinally across the row conductors of that row electrode.

13. The display device of claim 12, wherein, for each column electrode, the two or more column jumpers electrically bridge the column conductors of that column electrode substantially at a pair of column conductor segment midpoints; and wherein, for each row electrode, the two or more row jumpers electrically bridge the row conductors of that row electrode substantially at a pair of row conductor segment midpoints.

14. The display device of claim 12, wherein each column jumper visually intersects a corresponding row jumper at an angle from the plane of the display grid.

15. The display device of claim 14, wherein the intersection occurs at a column jumper midpoint and a row jumper midpoint.

16. The display device of claim 15, wherein the column jumper midpoint and the row jumper midpoint are aligned to the longitudinal axis and the lateral axis, respectively.

17. The display device of claim 11, wherein a length of the positively angled column conductor segment is equal to a length of the negatively angled column conductor segment;

wherein a length of the positively angled row conductor segment is equal to a length of the negatively angled row conductor segment;

wherein an angle of the positively angled column conductor segment is an additive inverse of an angle of the negatively angled column conductor segment; and wherein an angle of the positively angled row conductor segment is an additive inverse is an additive inverse of an angle of the negatively angled row conductor segment.

18. The display device of claim 11, wherein the column conductor segment midpoint and the row conductor segment midpoint are aligned to the longitudinal axis and the lateral axis, respectively.

19. The display device of claim 11, wherein the column segment midpoint of each negatively angled column segment substantially visually intersects the row segment midpoint of each negatively angled row segment.

20. A display device having a capacitive touch-sensitive sensor, the display device comprising:

a display grid including a plurality of pixel rows substantially aligned to a lateral axis, and a plurality of pixel columns substantially aligned to a longitudinal axis, a column electrode array including a plurality of column conductors each extending substantially along the longitudinal axis and spaced apart a column conductor distance, each column conductor alternately including a plurality of positively angled column conductor segment and negatively angled column conductor segment pairs, each positively angled column conductor segment and negatively angled column conductor segment having a column conductor segment midpoint, and angled relative to the longitudinal axis;

a row electrode array including a plurality of row conductors each extending substantially along the lateral axis and spaced apart a row conductor distance, each row conductor alternately including a plurality of positively angled row conductor segment and negatively angled row conductor segment pairs, each positively angled row conductor segment and negatively angled row conductor segment having a row segment midpoint and angled relative to the lateral axis;

for each column electrode, two or more column jumpers electrically bridging the column conductors of that column electrode, the two or more column jumpers having a column jumper zigzag structure;

for each row electrode, two or more row jumpers electrically bridging the row conductors of that row electrode, the two or more row jumpers having a row jumper zigzag structure; and a plurality of pseudo jumpers positioned between adjacent column electrodes and between adjacent row electrodes, the plurality of pseudo jumpers configured to be non-conductive across their entire lengths, wherein the column jumpers intersect respective column conductors at one or more angles;

wherein the row jumpers intersect respective row conductors at the one or more angles;

wherein a subset of the column jumpers visually intersects a subset of the row jumpers at the one or more angles; and wherein the column segment midpoint of each negatively angled column segment visually intersects the row segment midpoint of each negatively angled row segment from a viewing direction substantially perpendicular to a plane of the display grid.

* * * * *